United States Patent
Morozov et al.

(10) Patent No.: US 11,846,500 B2
(45) Date of Patent: Dec. 19, 2023

(54) THREE-DIMENSIONAL DEPTH MEASURING DEVICE AND METHOD

(71) Applicant: Samsung Electronics Co., Ltd., Suwon-si (KR)

(72) Inventors: Kostiantyn Morozov, Kyiv (UA); Oleksandr Klimenkov, Kyiv (UA); Dmytro Vavdiiuk, Kyiv (UA); Ivan Safonov, Kyiv (UA); Andrii But, Kyiv (UA); Andrii Sukhariev, Kyiv (UA); Ruslan Iermolenko, Kyiv (UA); Serhii Iliukhin, Kyiv (UA); Yaroslav Lavrenyuk, Kyiv (UA)

(73) Assignee: Samsung Electronics Co., Ltd., Suwon-si (KR)

(*) Notice: Subject to any disclaimer, the term of this patent is extended or adjusted under 35 U.S.C. 154(b) by 338 days.

(21) Appl. No.: 17/309,033

(22) PCT Filed: Oct. 28, 2019

(86) PCT No.: PCT/KR2019/014287
§ 371 (c)(1),
(2) Date: Apr. 15, 2021

(87) PCT Pub. No.: WO2020/091347
PCT Pub. Date: May 7, 2020

(65) Prior Publication Data
US 2022/0011096 A1    Jan. 13, 2022

(30) Foreign Application Priority Data
Oct. 29, 2018   (KR) .......................... 10-2018-0130292

(51) Int. Cl.
*G06K 9/00*        (2022.01)
*G01B 11/25*       (2006.01)
(Continued)

(52) U.S. Cl.
CPC .............. *G01B 11/25* (2013.01); *G06T 7/521* (2017.01); *G06T 7/557* (2017.01)

(58) Field of Classification Search
CPC ................................ G06T 7/521; G06T 7/557
See application file for complete search history.

(56) References Cited

U.S. PATENT DOCUMENTS 8,326,020 B2   12/2012   Ee et al.
8,811,769 B1   8/2014    Pitts et al.
(Continued)

FOREIGN PATENT DOCUMENTS

AU    2008308677 A1  *  5/2010   ............. G01B 11/25
JP    2001-012909 A     1/2001
(Continued)

OTHER PUBLICATIONS

A state of the art in structured light patterns for surface profilometry, Joaquim Salvi et al., Elsevier, 2010, pp. 2666-2680 (Year: 2010).*
(Continued)

*Primary Examiner* — Jayesh A Patel

(57) ABSTRACT

A three-dimensional depth measuring method using a structured light camera comprising a first projector, a second projector, and an optical sensor, according to the present disclosure, comprises: a step in which a first light pattern is projected by the first projector; a step in which a second light pattern is projected by the second projector; a step of filtering, by a color filter, a third light pattern in which the first light pattern and the second light pattern reflected from an object overlap, so as to separate the third light pattern into a first filtered pattern and a second filtered pattern; a step of localizing the first filtered pattern and classifying first feature points of the first filtered pattern; a step of localizing the second filtered pattern and classifying second feature points of the second filtered pattern; and a step of obtaining
(Continued)

position information of the object on the basis of the first feature points and the second feature points.

20 Claims, 19 Drawing Sheets

(51) Int. Cl.
   *G06T 7/521* (2017.01)
   *G06T 7/557* (2017.01)

(56) References Cited

U.S. PATENT DOCUMENTS

| | | | |
|---|---|---|---|
| 10,012,493 B2* | 7/2018 | Kim | G01B 11/002 |
| 10,051,209 B2* | 8/2018 | Benmokhtar Benabdellah | H04N 9/3194 |
| 2003/0193659 A1* | 10/2003 | Uomori | G01S 17/46 348/E5.058 |
| 2009/0091581 A1* | 4/2009 | Lapa | G01B 11/25 345/582 |
| 2011/0221891 A1* | 9/2011 | Sonoda | G06T 7/521 348/135 |
| 2012/0105868 A1* | 5/2012 | Nomura | G01B 11/25 356/601 |
| 2013/0093881 A1* | 4/2013 | Kuwabara | G01B 11/25 348/135 |
| 2013/0321584 A1 | 12/2013 | Choi | |
| 2014/0204180 A1* | 7/2014 | Bloom | H04N 13/254 348/46 |
| 2016/0086335 A1* | 3/2016 | Sonoda | G06T 7/521 348/136 |
| 2016/0123721 A1 | 5/2016 | Kim et al. | |
| 2016/0150219 A1 | 5/2016 | Gordon et al. | |
| 2017/0034499 A1* | 2/2017 | Doron | H04N 23/56 |
| 2018/0227564 A1* | 8/2018 | Wolf | H04N 13/271 |

FOREIGN PATENT DOCUMENTS

| | | | | |
|---|---|---|---|---|
| JP | 2001012909 A | * | 1/2001 | G01B 11/25 |
| JP | 2016024052 A | * | 2/2016 | |
| KR | 10-2013-0136872 A | | 12/2013 | |
| KR | 10-2015-0098035 A | | 8/2015 | |
| KR | 20150098035 A | * | 8/2015 | |
| KR | 10-2015-0101749 A | | 9/2015 | |
| KR | 10-2016-0051070 A | | 5/2016 | |
| KR | 10-2017-0013704 A | | 2/2017 | |
| KR | 20170013704 A | * | 7/2017 | |
| WO | WO-2009046218 A2 | * | 4/2009 | G01B 11/25 |
| WO | WO-2016183395 A1 | * | 11/2016 | G02B 27/01 |
| WO | WO-2018063696 A1 | * | 4/2018 | G01S 1/00 |

OTHER PUBLICATIONS

A Robust Surface Coding Method for Optically Challenging Objects Using Structured Light, Chi Zhang et al., IEEE, 2014, pp. 775-788 (Year: 2014).*
Neural network digital fringe calibration technique for structured light profilometers, Matthew J Baker et al., Applied Optics, 2007, pp. 1233-1243 (Year: 2007).*
International Search Report and Written Opinion of the International Searching Authority in connection with International Application No. PCT/KR2019/014287 dated Feb. 5, 2020, 11 pages.
Request for the Submission of an Opinion dated Oct. 12, 2023, in connection with Korean Patent Application No. 10-2018-0130292, 13 pages.

* cited by examiner

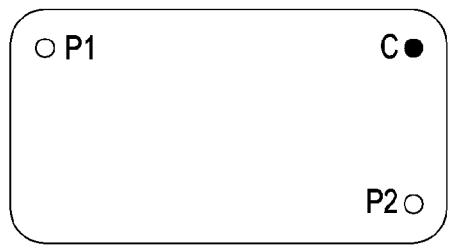
FIG. 11A
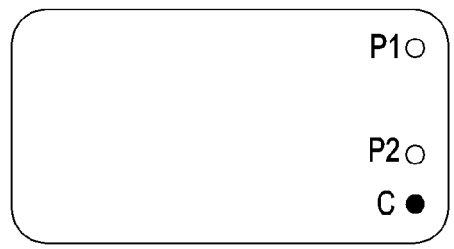
FIG. 11B
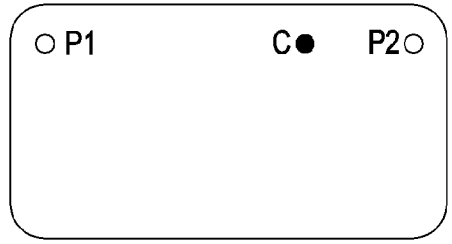
FIG. 12A
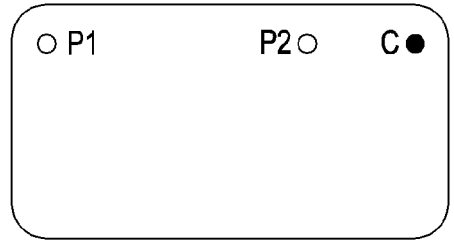
FIG. 12B
FIG. 12C
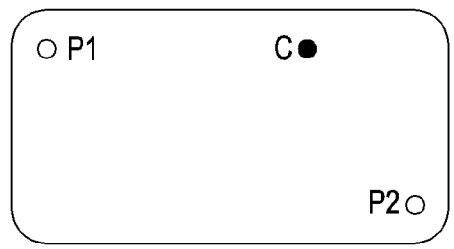
FIG. 12D
FIG. 12E
FIG. 12F
P1: FIRST PROJECTOR
P2: SECOND PROJECTOR
C: CAMERA

PERIOD-5 PATTERN

PERIOD-6 PATTERN

LONG-PERIODIC COMBINED
PATTERN – PERIODICITY 30

FEATURE POINT PATTERN TYPE OF FIRST PROJECTOR

FEATURE POINT PATTERN TYPE OF SECOND PROJECTOR

FRAGMENT PATTERN TYPE OF FIRST PROJECTOR

FRAGMENT PATTERN TYPE OF SECOND PROJECTOR

OVERLAP BETWEEN TWO PATTERNS

P1: FIRST PROJECTOR
P2: SECOND PROJECTOR
C: CAMERA

THREE-DIMENSIONAL DEPTH MEASURING DEVICE AND METHOD

CROSS-REFERENCE TO RELATED APPLICATIONS

This application is a 371 National Stage of International Application No. PCT/KR2019/014287 filed Oct. 28, 2019, which claims priority to Korean Patent Application No. 10-2018-0130292 filed Oct. 29, 2018, the disclosures of which are herein incorporated by reference in their entirety.

BACKGROUND

1. Field

The present disclosure relates to a method and apparatus for measuring a three-dimensional (3D) depth by using a structured light camera.

2. Description of Related Art

Image processing technology is evolving from a two-dimensional (2D) image content service to a three-dimensional (3D) image content service. Compared to 2D image content, 3D image content may provide a 3D feeling, that is, a sense of perspective. In general, depth information should be provided for each subject included in an image in order to provide a sense of perspective.

Technologies related to various types of depth measurement methods and apparatuses have been continuously developed over the recent years. Due to the development of the related technologies, the depth measurement methods and apparatuses have been used in various fields. For example, a method and apparatus for measuring a depth according to the present disclosure may be used for user face recognition, real 3D avatar, virtual makeup and try-on of clothes, 3D photography, gesture recognition, 3D content creation for virtual reality (VR), accurate and realistic augmented reality (AR), scene understanding, and general-purpose 3D scanning.

FIG. 2 is a diagram illustrating various types of 3D reconstruction methods (depth measurement methods).

The 3D reconstruction methods include 3D reconstruction using a single camera, 3D reconstruction using multiple cameras, and 3D reconstruction using an active illumination 3D camera.

3D reconstruction using a single camera includes motion depth measurement and single image depth measurement.

The motion depth measurement is a scheme of measuring a 3D depth by estimating a motion such as hand tremor during shooting, despite use of a single camera. Despite the benefit of implementation in software without using an additional device, the motion depth measurement scheme has low accuracy and low throughput for an area without features, and requires much time for obtaining a depth mage, acquisition of a plurality of frames, and reconstruction of morphing scenes.

While the single image depth measurement scheme enables depth measurement in one frame without using an additional device, it suffers from low accuracy and many errors, particularly for unknown scenes.

3D reconstruction using multiple cameras is a depth measurement scheme using a plurality of cameras or a stereo camera. A 3D depth may be measured from obtained images by using the parallax between a plurality of lenses. A device configuration is relatively simple, and the depths of objects may be measured by obtaining one frame from each lens at the same time point and analyzing the obtained frames. However, the depth measurement using multiple cameras has very high computation complexity and low throughput for surfaces without features.

3D reconstruction using an active illumination 3D camera includes 3D reconstruction using a time-of-flight (ToF) camera and 3D reconstruction using a structured light camera.

A ToF camera is an imaging camera system that measures a distance based on the known speed of light and the flight time measurement of a light signal between a camera and a subject for each point in the image.

The ToF camera provides low computational complexity, high accuracy for a long distance, and relatively low accuracy for a short distance. The shortcomings of the ToF camera lie in a very complex hardware configuration and difficulty in recognizing translucent and glinting representations.

A structured light camera refers to a camera that geometrically reconstructs the surface shape of a 3D object by projecting narrow-band light emitted from a projector onto the surface of the 3D object and thus creating illumination lines distorted from a viewpoint other than the viewpoint of the projector. The depth of a 3D object may be measured with the structured light camera.

The structured light camera has high accuracy for a short distance, medium computational complexity, and medium complexity of hardware implementation. On the other hand, the accuracy is somewhat low for a distance, and it is difficult to recognize dark, translucent, and glinting representations.

For accurate depth measurement based on a structured light camera, the sizes of feature points should be reduced, the accuracy of feature point localization should be increased, and depth noise should be reduced, to use various types of patterns. Further, when the depth noise is maintained at an acceptable level, it is necessary to increase an operating depth range and reduce a shadow zone.

SUMMARY

According to an embodiment of the present disclosure, a method and apparatus for measuring a 3D depth by using a structured light camera are provided.

According to an embodiment of the present disclosure, a method and apparatus for measuring a 3D depth by using a structured light camera are provided, which may increase a shadow measurement range and reduce a shadow zone.

According to the present disclosure, a method of measuring a 3D depth by using a structured light camera including a first projector, a second projector, and an optical sensor includes projecting a first light pattern by the first projector, projecting a second light pattern by the second projector, separating a third light pattern into a filtered first pattern and a filtered second pattern by filtering the third light pattern using a color filter, the third light pattern being generated by overlap between the first light pattern and the second light pattern which have been reflected from an object, localizing the filtered first pattern, classifying first feature points of the localized first pattern, localizing the filtered second pattern, classifying second feature points of the localized second pattern, and obtaining position information about the object based on the first feature points and the second feature points.

According to the present disclosure, an apparatus for measuring a 3D depth by using a structured light camera includes a first projector configured to project a first light pattern, a second projector configured to project a second light pattern, an optical sensor configured to sense the first light pattern and the second light pattern, and at least one processor coupled to the first projector, the second projector, and the optical sensor. The at least one processor is configured to separate a third light pattern into a filtered first pattern and a filtered second pattern by filtering the third light pattern using a color filter, the third light pattern being generated by overlap between the first light pattern and the second light pattern which have been reflected from an object, localize the filtered first pattern, classify first feature points of the localized first pattern, localize he filtered second pattern, classify second feature points of the localized second pattern, and obtain position information about the object based on the first feature points and the second feature points.

The first projector, the second projector, and the optical sensor may be located in a straight line. The first projector, the second projector, and the optical sensor may not be located in a straight line. The first projector and the second projector are located opposite to each other with respect to the optical sensor or on the same side of the optical sensor.

The wavelengths of the first light pattern and the second light pattern may be in the same band or different bands. The first light pattern and the second light pattern may have the same or different periodicities.

The optical sensor may be spaced from the first projector by a first base-line distance and from the second projector by a second base-line distance, and the first base-line distance and the second base-line distance may be different.

The position information about the object may be obtained based on a disparity of the first light pattern and a disparity of the second light pattern.

Other aspects, benefits, and key features of the present disclosure will be described in conjunction with the accompanying drawings and apparent to those skilled in the art from the following detailed description of preferred embodiments of the present disclosure.

According to various embodiments of the present disclosure, the 3D depth measurement method based on a structured light depth camera may increase depth measurement accuracy and reduce a shadow zone, thereby extending a depth measurement range.

Besides, the depth range of the structured light depth camera may be increased, the sizes of feature points may be reduced, the density and number of 3D points may be increased, the 3D noise of a background object (a far object) may be reduced, and a shadowing effect caused by a foreground object (a near object) may be reduced.

BRIEF DESCRIPTION OF THE DRAWINGS

FIG. 11A is a diagram illustrating the structure of an exemplary camera matrix wavelength filter mask in the case of two projectors.

FIG. 11B is a diagram illustrating the structure of an exemplary camera matrix wavelength filter mask in the case of four projectors.

FIGS. 12A, 12B, 12C, 12D, 12E, and 12F are diagrams illustrating exemplary arrangements of a camera and projectors in the structured light depth camera according to the present disclosure.

DETAILED DESCRIPTION

Figure 1:
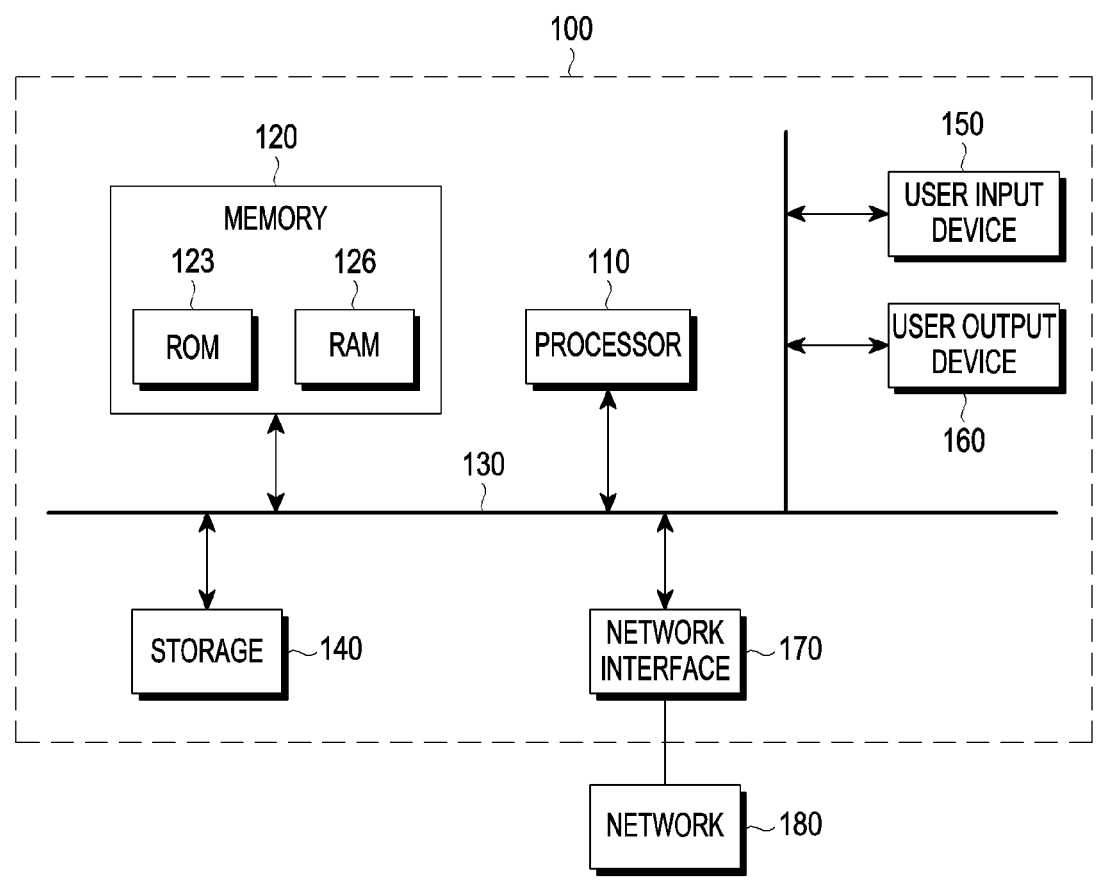
FIG. 1 is an exemplary diagram illustrating the configuration of a computer system that implements a 3D depth measurement method using a structured light camera according to various embodiments proposed in the present disclosure.
Figure 2:
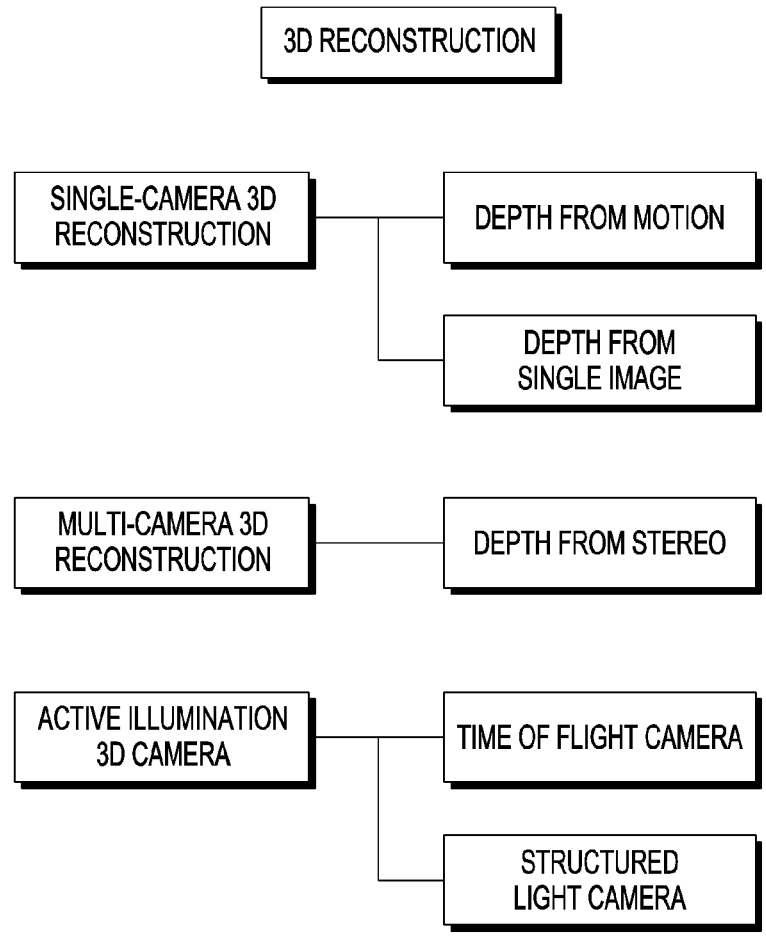
FIG. 2 is a diagram illustrating classification of various types of 3D reconstruction methods (depth measurement methods).

The operation principle of preferred embodiments of the disclosure will be described below in detail with reference to the attached drawings. Like reference numerals denote the same components throughout the drawings. A detailed description of a generally known function or structure of the disclosure will be avoided lest it should obscure the subject matter of the disclosure. Although the terms used in the present disclosure are defined in consideration of functions in the disclosure, the terms may be changed according to the intention of a user or an operator, or customs. Therefore, the definitions should be made, not simply by the actual terms used but by the meanings of each term lying within.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning "and/or"; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

The disclosure may be modified in various manners and have various embodiments, and specific embodiments will be described with reference to the drawings. However, it should be appreciated that various embodiments of the present disclosure and the terms used therein are not intended to limit the technological features set forth herein to particular embodiments and include various changes, equivalents, or replacements for a corresponding embodiment.

It is to be understood that the singular forms "a," "an," and "the" include plural referents unless the context clearly dictates otherwise. Thus, for example, reference to "a component surface" includes reference to one or more of such surfaces.

The term as used in the disclosure, "1st", "2nd", "first" or "second' may be used for the names of various components, not limiting the components. These expressions are used to distinguish one component from another component. For example, a first component may be referred to as a second component and vice versa without departing the scope of the disclosure. As used herein, the term "and/or" includes any and all combinations of one or more associated items.

The terms used in this application are merely for the purpose of describing particular embodiments and are not intended to limit the disclosure. Singular forms are intended to include plural forms unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art. Unless otherwise defined, the terms should not be interpreted as ideally or excessively formal meanings.

An electronic device according to various embodiments of the disclosure may include a communication function. For example, an electronic device may be any of a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, mobile medical equipment, a camera, or a wearable device (e.g., a head-mounted device (HMD)), electronic clothes, an electronic bracelet, an electronic necklace, an electronic appcessory, an electronic tattoo, and a smart watch.

According to some embodiments of the disclosure, an electronic device may be a smart home appliance equipped with a communication function. The smart home appliance may be any of a television, a digital versatile disk (DVD) player, an audio player, a refrigerator, an air conditioner, a vacuum cleaner, an oven, a microwave oven, a washer, a drier, an air purifier, a set-top box, a TV box (e.g., Samsung HomeSync™, Apple TV™, or Google TV™), a gaming console, an electronic dictionary, a camcorder, and an electronic picture frame.

According to various embodiments of the disclosure, an electronic device may be any of a medical device (e.g., a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., a naval navigation device, a gyrocompass, or a compass), an avionic electronic device, a security device, an industrial or consumer robot, and so on.

According to various embodiments of the disclosure, an electronic device may be any of furniture, part of a building/structure, an electronic board, an electronic signature receiving device, a projector, and various measuring devices (e.g., a water, electricity, gas or electro-magnetic wave measuring device) which have a communication function.

According to various embodiments, an electronic device may be one or a combination of two or more of the foregoing devices. It would be obvious to those skilled in the art that an electronic device according to a preferred embodiment of the disclosure is not limited to the foregoing devices.

According to various embodiments of the present disclosure, a device that transmits and receives virtual reality (VR) content may be, for example, an electronic device.

Terms used in embodiments of the present disclosure are defined as follows.

An image may be a video, a still image, or the like, and image content may include various types of multimedia content such as audio and subtitles as well as videos and still images. VR content includes image content that provides an image in the form of a 360-degree video, a 3D video, or the like. A media file format may be a media file format compliant with various media-related standards such as an International Organization for Standardization (ISO)-based media file format (ISOBMFF).

Projection refers to a process of projecting a spherical image for representing a 360-degree image onto a planar surface or an image frame resulting from the process. Mapping refers to a process of mapping image data on a plane, obtained by the projection, to a 2D plane or an image frame resulting from the process. Omnidirectional media include, for example, an image or video and/or related audio which may be rendered according to the direction of the user's head movement or according to the user's viewport, when the user uses an HMD. A viewport also called a field of view (FoV) refers to an area of an image viewed to a user at a specific time point (the area of the image may be an area of a spherical image).

A detailed description will be given of preferred embodiments of the present disclosure with reference to the accompanying drawings.

FIG. 1 is an exemplary diagram illustrating the configuration of a computer system that implements a depth measurement method according to various embodiments of the present disclosure.

Referring to FIG. 1, a computer system 100 may include at least one processor 110, at least one memory 120, and at least one interface 150, 160, and 170.

The processor 110 may be a central processing unit (CPU) or a semiconductor device that processes instructions stored in the memory 120.

The processor 110 may be a controller that provides overall control to the operations of the computer system 100. The controller may perform operations of the computer system 100 by reading and executing program codes stored in the memory 120. In the processor 110, a plurality of processors may be independently configured in hardware on a function basis. For example, the processor 110 may include an application processor (AP) that processes installation and operation of applications in the computer system 100 and a communication processor (CP) that processes communication for the computer system 100, as independent hardware configurations. Further, processors that execute different functions in a single chip may be configured in the form of modules.

The processor 110, the memory 120, a storage 140, a user input device 150, a user output device 160, and a network interface 170 in the computer system 100 may communicate with each other via a data communication bus 130.

The memory 120 and the storage 140 may be integrated into one hardware configuration. The memory 120 and the storage 140 may include various types of volatile or non-volatile storage media. For example, the memory 120 may include a read only memory (ROM) 123 and a random access memory (RAM) 126. The storage 140 may include a non-volatile memory such as a magnetic tape, a hard disk drive (HDD), a solid state drive (SDD), an optical data device, and a flash memory.

According to an embodiment, a depth measurement method may be implemented as executable by a computer. When the depth measurement method is performed in a computer device, it may be performed by computer-readable instructions.

According to an embodiment, the depth measurement method may be implemented as a computer-readable code in a computer-readable recording medium. The computer-readable recording medium includes any kind of recording medium in which data decodable by a computer system is stored. For example, there may be ROM, RAM, magnetic tape, magnetic disk, flash memory, optical data storage device, and so on. Further, the computer-readable recording medium may be distributed to computer systems connected through a computer communication network, and stored and executed as code that may be read in a distributed manner.

Figure 3A:
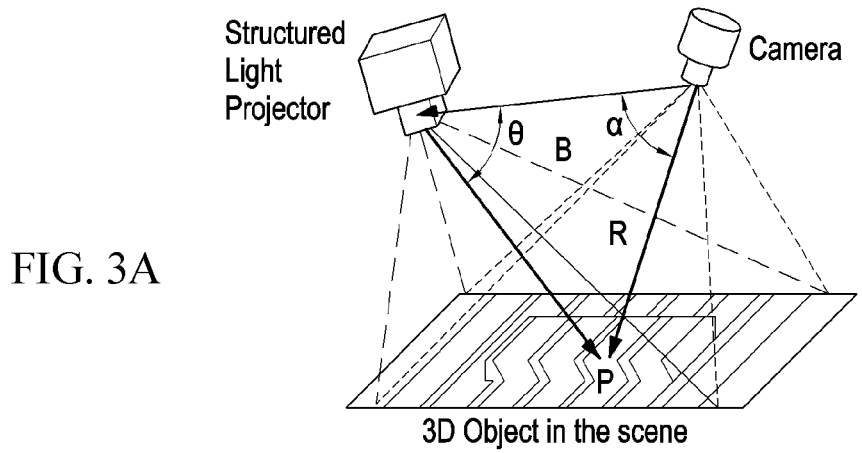
FIGS. 3A, 3B, and 3C are exemplary diagrams illustrating the structure of a structured light depth camera according to the present disclosure.
Figure 3B:
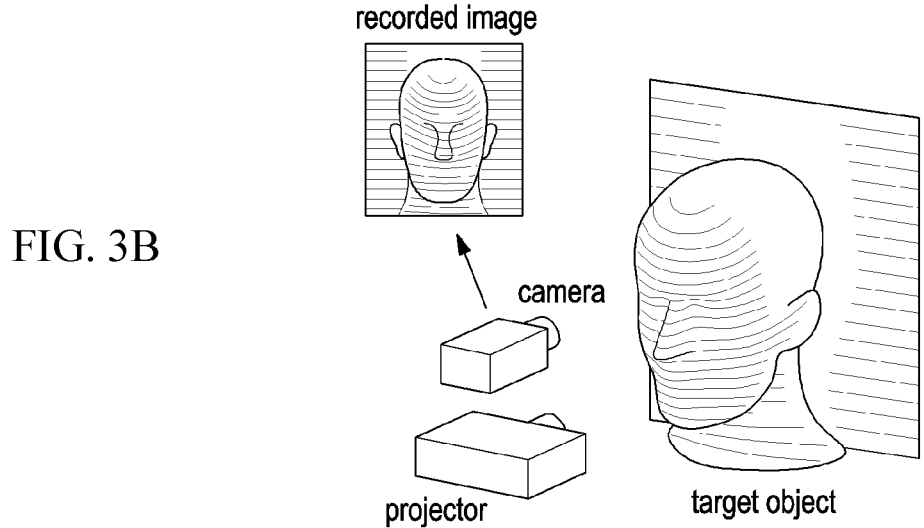
Figure 3C:
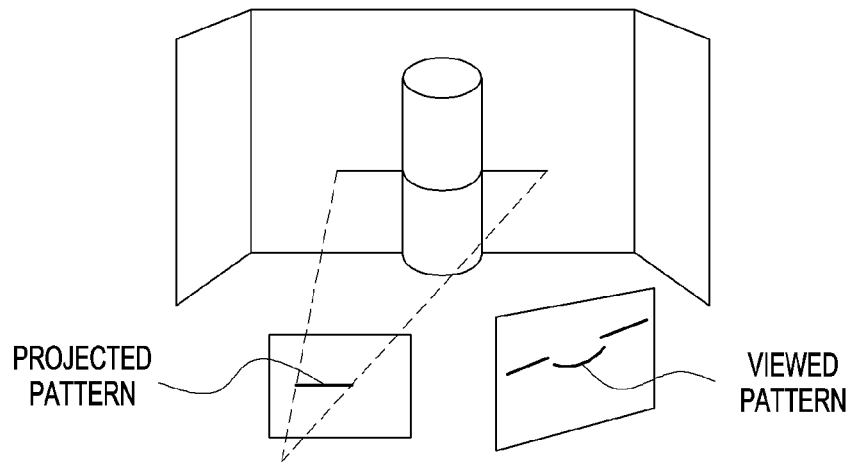

FIGS. 3A, 3B, and 3C are exemplary diagrams illustrating the structure of a structured light depth camera according to the present disclosure.

A depth camera is a device that obtains information about the volumetric shape of a surrounding scene. The depth camera may obtain depth information. The depth information may be represented in various manners. Methods of representing depth information include a depth map and a point cloud. The depth map may be represented as an ordinal image in which the brightness or color of each pixel represents the depth value of a corresponding fragment (scene fragment) in the scene. The point cloud represents a set of 3D points forming a surrounding scene. Depth information about the surrounding scene may be obtained in various methods. A detailed description will be given later of various methods of obtaining depth information.

A structured light camera is a kind of active illumination 3D camera. The structured light camera is also referred to as a structured light camera system, a structured light depth camera, or a structured light depth camera system.

The structured light camera includes a plurality of projectors and an optical sensor that senses projected light.

A projector is also referred to as a light illuminator. The projector may use near infrared light or far infrared light. The projector may also use light of other wavelengths. For example, the projector may use visible light or electromagnetic waves of other wavelengths. The projector may emit structured light in a wavelength of a specific region. The projector may generate and emit various types of structured light by adding a pattern to the structured light. The projector is also referred to as a structured light projector.

The optical sensor is also simply referred to as a camera. The optical sensor may be located at specific distances from the projectors. The distances between the optical sensor and the projectors may be referred to as a "base-line distances".

The structured light depth camera is a kind of active illumination depth camera that uses a projector projecting structured light of a specific pattern onto a scene as a light illuminator. The scene may mean an area from which structured light projected by the projectors are reflected. The projectors and the optical sensor (camera) may be directed to the same scene or subject from different directions.

Referring to FIG. 3A, a scene projected by a projector and a scene captured by an optical sensor correspond to each other. A scene does not necessarily mean a 2D plane. For example, the scene may be defined as the surface of an object according to the position of the object in a 3D space. However, the scene may include 3D information by adding depth information to a 2D-plane image structure.

Referring to FIG. 3B, the projector emits light in a predetermined pattern. The emitted light is reflected from a target object and captured by the optical sensor. The pattern of the captured light has been morphed from the pattern of the emitted light.

The light pattern emitted (projected) by the projector may be different from the light pattern captured by the camera. This may be attributed to the parallax between a position at which the projector emits the light pattern and a position at which the camera captures the light pattern.

The light pattern projected by the projector may be predetermined. The light pattern captured by the optical sensor may be analyzed based on the predetermined light pattern. The result of the analysis may be used to measure the depth of the surface (i.e., scene fragment) of the target object. The light pattern may be generated by a laser interference method or a projection method. In the present disclosure, the method of generating a light pattern is not limited to any particular method.

In the laser interference method, a light pattern of a desired shape is modulated by interfering with planar laser light. In the projection method, a desired light pattern is generated by passing light through a digital spatial light modulator. The projection method may generate a light pattern by using a transmissive liquid crystal, a reflective liquid crystal on silicon (LCOS), and a digital light processing (DLP) modulator. The DLP modulator may use a moving micro mirror. The structured light camera may use various light patterns, often parallel stripes. FIG. 3B illustrates an image obtained by capturing the light pattern of parallel stripes emitted from the projector by the camera from a different perspective. The depths of the surfaces of the object may be measured by analyzing the light pattern captured by the camera, based on the known light pattern.

Referring to FIG. 3C, a light pattern in a capturing direction of the camera may be different from a light pattern in a projection direction of the projector.

The light pattern generated by the projector may be reflected from the object and captured by the camera. The light pattern generated by the projector and the light pattern captured by the camera may not match. That is, the light pattern generated by the projector may be morphed into the light pattern captured by the camera due to the parallax between the projector and the camera. The light pattern generated by the projector may include a plurality of first pattern fragments. The captured light pattern may include a plurality of second pattern fragments. The plurality of first pattern fragments may be reflected from fragments of the scene and morphed into the plurality of second pattern fragments.

The captured light pattern may be morphed according to the depths of corresponding scene fragments due to a parallax effect at the position of the camera. A scene may refer to an area that reflects a light pattern. Further, a scene fragment may refer to a part of the scene. Accordingly, the scene fragment may be specified according to the surface of the object. The captured light pattern may include the plurality of second pattern fragments into which the plurality of first fragments reflected from the scene fragments have been morphed. The plurality of first pattern fragments may further be divided into smaller pattern fragments, for analysis.

The 3D position of each scene fragment may be obtained by measuring the depth of the scene fragment. In the depth measurement, as the unit of a first pattern fragment is smaller, it takes a longer time to calculate the depth, but with increased accuracy. Accordingly, the size of the first pattern fragment may be determined in consideration of the accuracy of depth measurement and a calculation speed.

More accurate data may be additionally generated by interpolation based on data obtained through the depth measurement.

The morphed light pattern, that is, the captured light pattern may be used to estimate the depth of a scene fragment corresponding to a part of the object. The captured light pattern (the plurality of second pattern fragments) may be matched with an original light pattern, that is, the light pattern generated by the projector (the plurality of first pattern fragments) according to the estimated depth. The original light pattern including the plurality of first pattern fragments is generated such that each of the plurality of second pattern fragments may be distinguished well. Each of the plurality of first pattern fragments includes feature points. The feature points may be distinguished by matching the plurality of first pattern fragments with the plurality of second pattern fragments.

Figure 4:
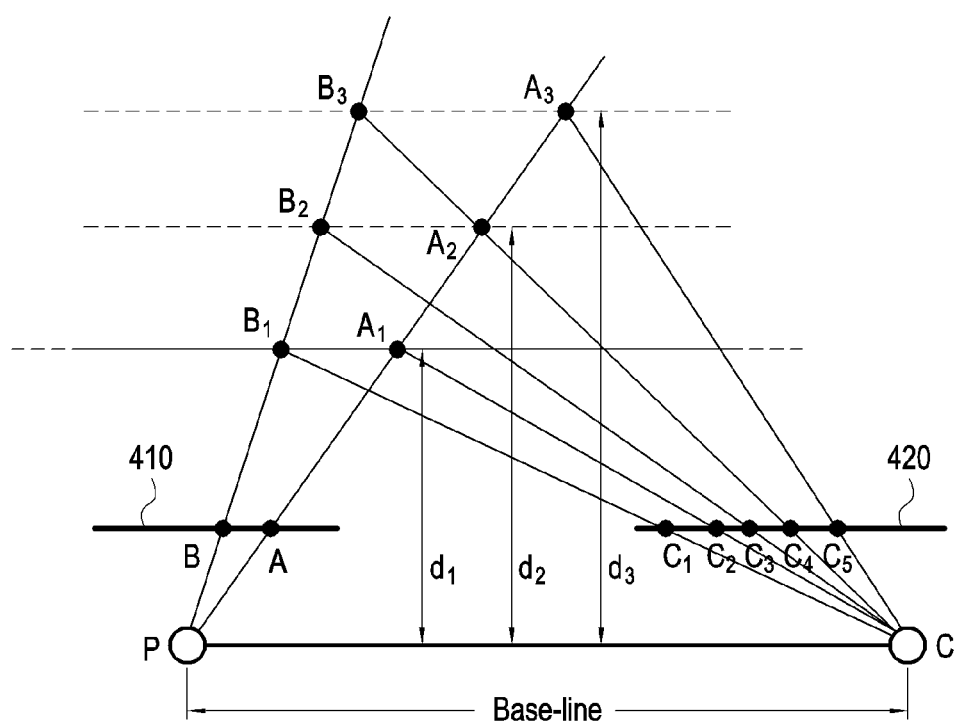
FIG. 4 is an exemplary diagram illustrating the structured light depth camera according to the present disclosure.

FIG. 4 is an exemplary diagram illustrating the structured light depth camera according to the present disclosure.

Referring to FIG. 4, the structured light depth camera includes a projector P that projects a specific light pattern and an optical sensor C (a camera or a camera module) that captures the projected light pattern reflected from an object.

The projector P is spatially separated from the optical sensor C. For example, the projector P may be positioned at a point P, whereas the optical sensor C may be positioned at a point C. The distance (line segment PC) between the optical sensor C and the projector P is referred to as a "base-line distance". That is, the distance between the point P and the point C corresponds to the base-line distance. Due to the distance (the base-line distance) between the optical sensor C and the projector P, the light pattern captured by the optical sensor C is morphed differently according to the distance of a scene fragment.

The base-line distance may be predetermined or determined afterwards. The depth value of each scene fragment may be estimated from the projected light pattern and the captured light pattern, based on the base-line distance.

According to an embodiment, it is assumed that the projector P and the optical sensor C are located according to the base-line distance, and the light pattern projected by the projector P includes two pattern fragments A and B. The pattern fragment A and the pattern fragment B are projected onto points A and B on a projector pattern plane, respectively. The paths of the pattern fragment A and the pattern fragment B are represented as lines.

The lines, line segment $BB_3$ and line segment $AA_3$ have specific intersection points $A_1$, $A_2$, $A_3$, $B_1$, $B_2$, and $B_3$ with objects having different depths $d_1$, $d_2$, and $d_3$, respectively. That is, the pattern fragments A and B corresponding to the lines, line segment $BB_3$ and line segment $AA_3$ may be reflect from the specific intersection points $A_1$, $A_2$, $A_3$, $B_1$, $B_2$, and $B_3$ of the objects. The specific intersection points may be referred to as scene fragments. The light patterns reflected from the scene fragments $A_1$, $A_2$, $A_3$, $B_1$, $B_2$, and $B_3$ of the objects may be obtained at different positions $C_1$, $C_2$, $C_3$, $C_4$, and $C_5$ on a camera frame plane 420.

For example, the pattern fragment A ($A_1$, $A_2$, and $A_3$) may appear at the positions of $C_2$, $C_4$, and $C_5$, and their respective depths are $d_1$, $d_2$, and $d_3$. The pattern fragment B ($B_1$, $B_2$, and $B_3$) may appear at the positions of $C_1$, $C_3$, and $C_4$, with their respective depths of $d_1$, $d_2$, and $d_3$.

According to an embodiment, the depths and 3D positions of the scene fragments of each object may be estimated by using the base-line distance, the original positions of the pattern fragments on a projector pattern plane 410 (the positions projected by the projector, the points A and B), and the captured positions of the pattern fragments (the positions captured on the camera frame plane 420, the points $C_1$, $C_2$, $C_3$, $C_4$, and $C_5$). For convenience of description, the pattern fragments generated by the projector may be referred to as first pattern fragments, and the pattern fragments captured by the camera may be referred to as second pattern fragments.

The first pattern fragments A and B may be reflected from the different scene fragments $A_2$ and $B_3$ and appear at the same position $C_4$ on the camera frame plane 420. For example, the scene fragment $A_2$ with the depth $d_2$ and the scene fragment $B_3$ with the depth $d_3$ appear at the position $C_4$ on the camera frame plane 420. In this case, since the light patterns of the scene fragments $A_2$ and $B_3$ overlap each other at the position $C_4$, a depth measurement error may be large.

Therefore, to obtain reliable depth information, it is necessary to clearly identify overlap between different pattern fragments. That is, the different pattern fragments appearing at the same position in a frame should be distinguished from each other.

In another aspect, increasing the resolution of the depth camera (decreasing the sizes of the first pattern fragments) may reduce generation of the second pattern fragments at the same position.

Figure 5:
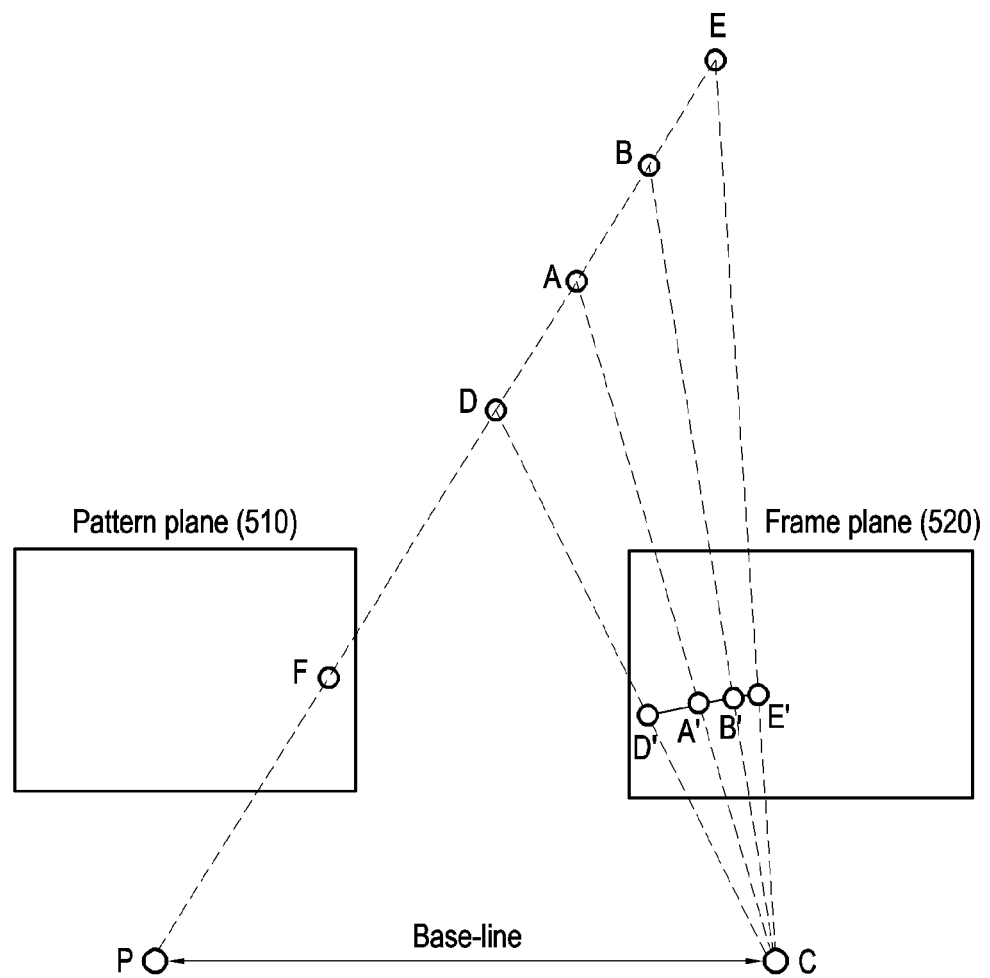
FIG. 5 is an exemplary diagram illustrating a method of measuring a depth by using a pattern plane of a projector and a frame plane of an optical sensor in the structured light camera according to the present disclosure.

FIG. 5 is an exemplary diagram illustrating a method of measuring a depth by using a pattern plane 510 of a projector and a frame plane 520 of an optical sensor in the structured light camera according to the present disclosure.

Referring to FIG. 5, a depth measurement apparatus (a structured light depth camera or a structured light depth camera system) may include at least one camera (optical sensor) C and at least one projector P.

The projector P projects a light pattern including basic recognizable elements called key points. The basic recognizable elements may be specified as feature points.

When a ray projected from the projector P and passed through a feature point F on the pattern plane 510 is reflected from points A, B, D, and E having different depths, the reflected rays reach points A', B', D', and E' on the frame plane 520 of the camera C, respectively.

When the ray is reflected at the point B, the reflected ray reaches the point B' on the camera frame plane 520.

When the point D has a minimum accessible depth and the point E has a maximum accessible depth, the light pattern passed through the point F on the pattern plane 510 may be reflected from objects in a range between the depth of the point D and the depth of the point E (i.e. scene fragments of an object located on line segment DE), and a first line (line segment D'E') between projections D' and E' on the frame plane 520 of the camera may include all possible projections of the feature point F.

However, the distortion of the camera may lead to the distortion of the first line.

Figure 6:
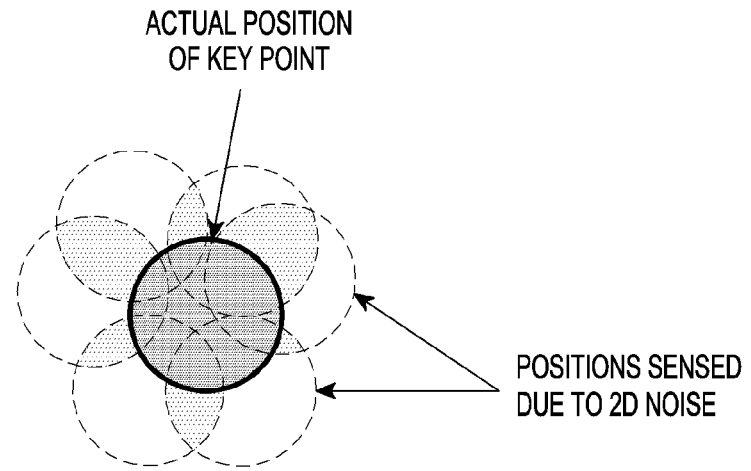
FIG. 6 is an exemplary diagram illustrating a method of estimating a key point in consideration of 2D noise in the depth measurement method according to the present disclosure.

FIG. 6 is an exemplary diagram illustrating a method of estimating a key point in consideration of 2D noise in the depth measurement method according to the present disclosure.

Referring to FIG. 6, to estimate the position of an actual key point, the captured key point is triangulated. 3D positions at which feature points of a scene are reflected are calculated by triangulation. For the triangulation, it is necessary to know the original position of the key point in an original light pattern, a relative position of the camera, and the original light pattern.

Each key point should be different from other determined neighboring key points. Each key point may be differentiated from the determined other neighboring key points by adding unique characteristics such as shape, brightness, and size to the key point.

However, the sizes of key points should be generally increased to diversify key point types. When the sizes of key points are increased, the density of key points of the light pattern and the elaborateness of the scene decrease.

Another aspect of 3D reconstruction relates to the localization accuracy of key points.

In practice, as with the specificity (high-level texturing) of an environment and a scene, key points may not be localized very accurately due to the non-idealness and limitations of hardware and thus, 2D noise is detected. The 2D noise may correspond to the projection surface of the projector.

During triangulation (unprojection), the depth values of points may be calculated by the following equation.

$$z = \frac{bf}{d} \qquad \text{[Equation 1]}$$

In [Equation 1], b represents the base-line length (the distance between the camera and the projector).

f represents a focal distance.

d represents a disparity value.

The disparity value is the distance between the captured 2D position of a feature point and the position of the feature point in the original light pattern. The inaccuracy of a key point localization procedure leads to the depth noise of the point.

In the above equation, the depth of the key point is inversely proportional to the disparity value, and a 3D noise value increases with the depth of the scene. The inaccuracy increases with a farther scene.

$$z \pm \Delta = \frac{bf}{d \mp \delta'} \Delta \approx \frac{\delta \cdot z^2}{bf} \qquad \text{[Equation 2]}$$

$\Delta$ is a 3D noise value, and $\delta$ is a 2D noise value.

For a given z, the 2D noise value $\delta$ may be decreased and the base-line length b and the focal length f may be increased, in order to reduce the 3D noise value $\Delta$.

Therefore, the base-line distance may be increased to reduce the 3D noise value for a far-field object. When the base-line distance is too large at the same time, a near-field object may appear outside the FoV of the projector (in a blind zone). That is, when the base-line distance is increased, the depth of the near-field object may not be measured.

Figure 7:
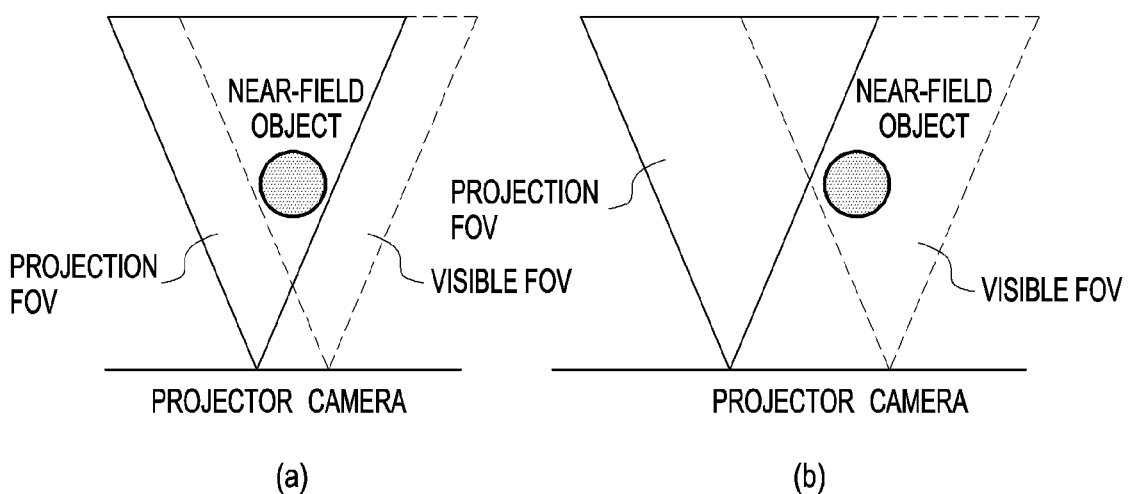
FIG. 7 is an exemplary diagram illustrating the depth measurement method according to the present disclosure.

FIG. 7 is an exemplary diagram illustrating a depth measurement method according to the present disclosure.

FIG. 7(a) illustrates the FoVs of a projector and a camera with a short base-line for a near-field object. The FoV of the projector may be referred to as the projection FoV, and the FoV of the camera may be referred to as the visible FoV. FIG. 7B illustrates the FoV of a projector and a camera with a long base-line for a near-field object.

For a long base-line, the near-field object may be located outside the projection FoV area of the projector. Therefore, the base-line should be short to provide recognition of a near-field object, whereas at the same time, the base-line should be long to provide a low 3D noise value for a far-field object. As such, there is a trade-off relationship between recognition of a near-field object and a low 3D noise value.

Figure 8:
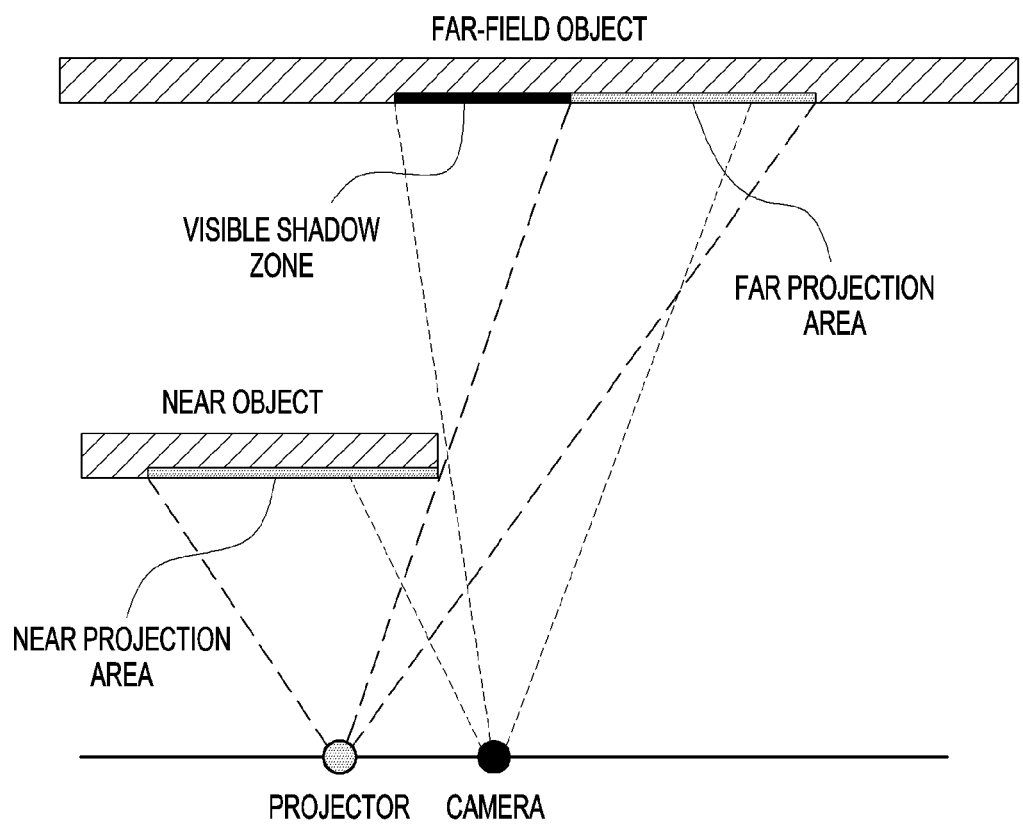
FIG. 8 is an exemplary diagram illustrating visible shadows emergence in the depth measurement method according to the present disclosure.

FIG. 8 is an exemplary diagram illustrating visible shadows emergence in the depth measurement method according to the present disclosure.

Figure 9:
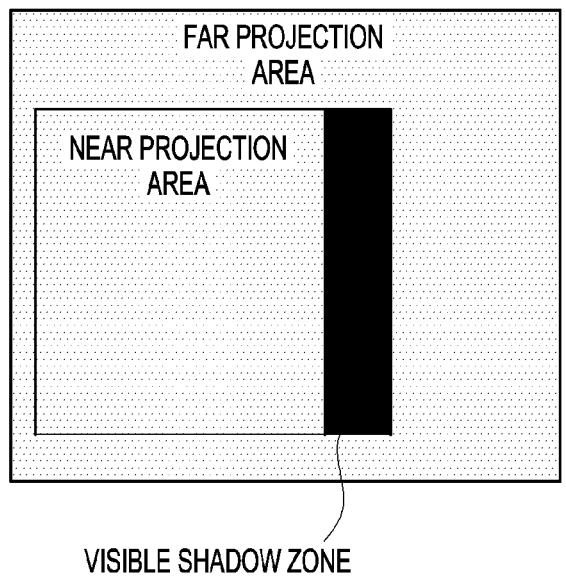
FIG. 9 is an exemplary diagram illustrating a visible shadow zone in the depth measurement method according to the present disclosure.

FIG. 9 is an exemplary diagram illustrating a visible shadow zone in the depth measurement method according to the present disclosure.

A shadowing effect created by a near-field object affects a far-field object. When light emitted from the projector does not reach the far-field object due to the near-field object, the depth of the far-field object in the visible area of the camera may not be measured. An area including a far-field object shielded by a near-field object is referred to as a visible shadow zone.

Referring to FIG. 8, a plan layout of a projector and a camera is shown to describe the visible shadow zone. FIG. 9 is a front view illustrating a visible shadow zone in the front direction of the camera.

Referring to FIGS. 8 and 9, when a far object is shielded by a near object, the depth of the far object may not be measured. That is, a shadow zone is generated by the near object. However, since the shadow zone is visible to the camera at the position of the camera, the shadow zone may be referred to as a visible shadow zone. Since light from the projector does not reach the visible shadow zone, the depths of objects located in the visible shadow zone may not be measured.

In other words, the shadow of the near object generated by illumination of the projector covers the visible scene fragment of the far object due to the base-line between the camera and the projector. Since the visible scene fragment of the far object is not illuminated, a shadow is formed. That is, depth information about the visible scene fragment of the unilluminated far object in the shadow zone may not be obtained.

A plurality of projectors operating in different light wavelengths instead of a single wavelength may be used. One camera module may simultaneously capture all kinds of illuminations from the plurality of projectors, and divide the captured illuminations into separate image channels by using a color filer, as is similar to a red, green, blue (RGB) camera. However, structured light emitted from each of the projectors may be light in any one of various wavelengths, such as infrared light, visible light, and ultraviolet light, and the single camera may separately obtain a plurality of lights in various wavelength ranges. The single camera may determine arrangement of light sensing elements of an image sensor included in the camera, in correspondence with the mask of the used color filter.

Because the plurality of projectors are capable of projecting patterns in which key points are repeated with various periodicities, various types of key points may be increased according to overlap between the patterns. Further, unique combinations may be provided by combining different types of key points. The provided combinations of patterns may be aperiodic patterns.

The use of the plurality of projectors may enable providing of sufficiently various types of key points in spite of very small feature points. Generally, when feature points are small in size, various types of feature points may not be generated. Nonetheless, various types of feature points may be generated by overlapping light patterns, despite the small size of feature points. That is, when the projectors have different light patterns, overlapped key points may become more various. Further, even though the projectors use the same light pattern, all of key points at reflection positions may not be the same and thus overlapped key points may be diversified. When the light patterns of the projectors have different periodicities, a new periodicity may be generated according to the periodicities of the light patterns. Key points may be recognized more easily with more various light patterns.

Projectors with different base-line distances may be deployed, and a short base-line distance may be provided to capture a near-field object. Further, a long base-line may be provided to reduce 3D noise for far-field objects. Providing various types of key points along with different base-line lengths may enable more effective measurement of the depth of an object.

With the introduction of a plurality of projectors, the shadowing effect may be reduced. The shadowing effect may further be reduced by arranging the projectors opposite to each other with respect to the camera. The projectors may be located opposite to each other with respect to the camera or according to a combination of a horizontal position and a vertical position.

Because each key point may not be projected as a separate 3D point by each separate localized projector, the density of a point cloud may be increased.

The average of the positions of feature points from all projectors decreases localization noise.

Due to the use of the single camera, feature points may be detected in the coordinate space of the same frame, without the need for additional calibration and rectification.

Figure 10:
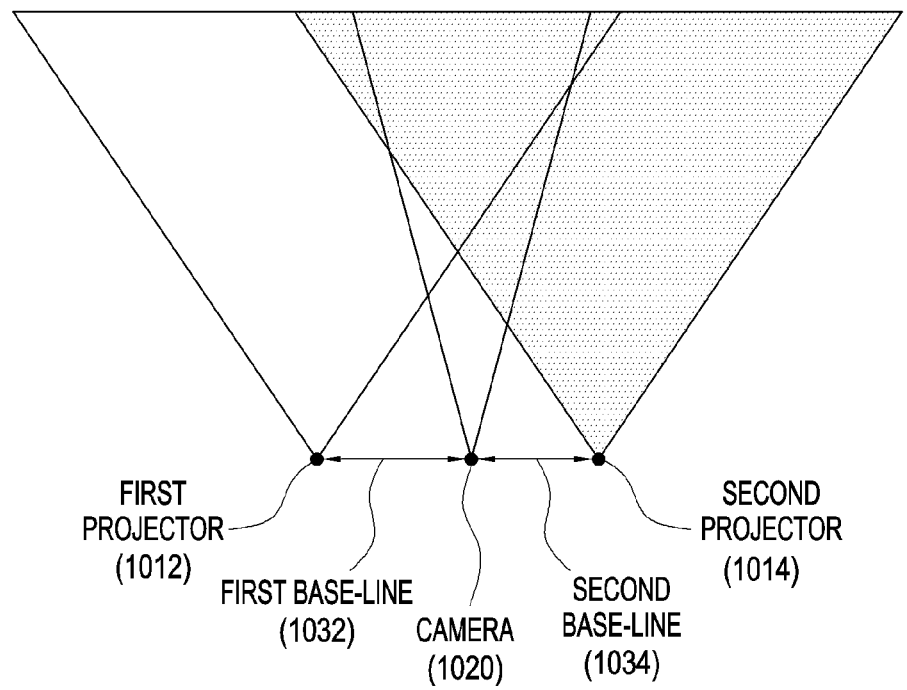
FIG. 10 is a diagram illustrating the structure of a structured light depth camera based on a plurality of projectors according to the present disclosure.

FIG. 10 illustrates the structure of a structured light depth camera according to the present disclosure.

Referring to FIG. 10, the distance between a camera 1020 and a first projector 1012 is a first base-line distance, and the distance between the camera 1020 and a second projector 1014 is a second base-line distance. The triangles illustrated in FIG. 10 represent the projection FoVs of the first and second projectors 1012 and 1014, and the visible FoV of the camera 1020.

FIG. 11A illustrates an exemplary structure of a camera matrix wavelength filter mask in the case of two projectors.

The two projectors may be the first and second projectors 1012 and 1014 of FIG. 10. The first and second projectors 1012 and 1014 may use light of different wavelengths, respectively. The first projector 1012 may emit a first light pattern, and the second projector 1014 may emit a second light pattern. When the first light pattern and the second light pattern have different wavelengths, the first light pattern and the second light pattern may be separated by a color filter. Further, despite use of similar wavelengths, the original source (the first or second projector) of captured light may be identified because each projector uses light of a different pattern. The camera matrix wavelength filter mask may separate the patterns corresponding to the projectors by selectively filtering the first light pattern projected from the first projector 1012 and the second light pattern projected from the second projector 1014.

FIG. 11B illustrates an exemplary structure of a camera matrix wavelength filter mask in the case of four projectors.

Numerals illustrated in FIG. 11B correspond to four respective projectors. For example, the four projectors may be a first projector, a second projector, a third projector, and a fourth projector. "1", "2", "3", and "4" marked on the camera matrix wavelength filter mask of FIG. 11B may denote a filter corresponding to the first projector, a filter corresponding to the second projector, a filter corresponding to the third projector, and a filter corresponding to the fourth projector, respectively.

An average performance may be achieved by uniformly arranging the filter elements of each projector, and depth information about the first projector may be estimated based on depth information about the other projectors (the second, third, and fourth projectors) by using neighboring filter elements. This is because depth information about adjacent areas is related to each other in many cases. However, when a depth rapidly changes at the boundary of each pixel, it is difficult to extract depth information about the pixel by referring to depth information about a neighboring pixel.

The structure of the camera matrix wavelength mask may be changed according to the positions of the projectors, the position of the camera, and relative positions between the projectors and the camera. When a shadow zone corresponds to a specific projector, a filter element of the specific projector may be excluded and a filter element of a projector capable of observing the shadow zone may be added, to thereby measure a depth more efficiently.

FIGS. 12A, B, C, D, E, and F illustrate exemplary arrangements of the camera and the projectors, in the structured light depth camera according to the present disclosure.

The camera and the plurality of projectors according to the present disclosure may be arranged in a straight line. The camera and the projectors are arranged in a straight line in FIG. 12B, FIG. 12C, FIG. 12D, and FIG. 12E.

In FIG. 12A, the first base-line between the first projector and the camera is perpendicular to the second base-line between the second projector and the camera, and in FIG. 12F, the first base-line is at a specific angle with the second base-line.

The depth of a near-field object may be estimated according to the positions of the camera and the plurality of projectors, and the depth of an object located in a shadow zone generated by the first projector may be measured by the second projector.

FIG. 13 is an exemplary diagram illustrating a method of combining two low periodic patterns to obtain a high periodic pattern.

Figure 13A:
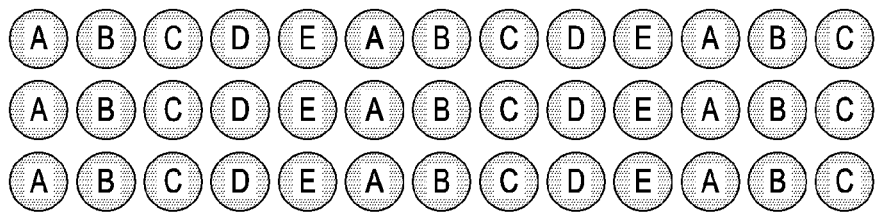
FIGS. 13A, 13B, and 13C are exemplary diagrams illustrating a method of combining two low periodic patterns to obtain a high periodic pattern.

FIG. 13A illustrates a period-5 pattern, which may be the pattern of the first projector.

Figure 13B:
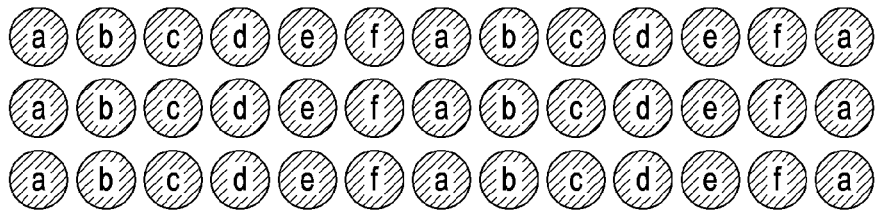

FIG. 13B illustrates a period-6 pattern, which may be the pattern of the first projector or the pattern of the second projector.

Simple patterns may be combined for one projector to generate a unique pattern. A unique pattern may also be generated by combining the pattern of the first projector with the pattern of the second projector.

Figure 13C:
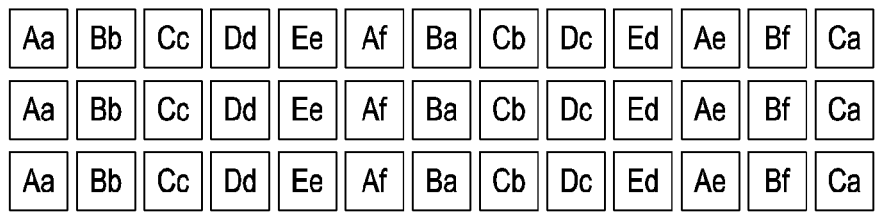

FIG. 13C illustrates a period-30 pattern generated by combining the pattern of FIG. 13A with the pattern of FIG. 13B.

When patterns of different wavelengths (colors) are projected from the first and second projectors, the patterns may be overlapped and input to the camera, and recognizable separately in the same image coordinate space.

Figure 14A:
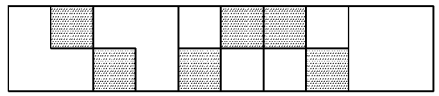
FIG. 14A illustrates a feature point pattern of a first projector.
Figure 14B:
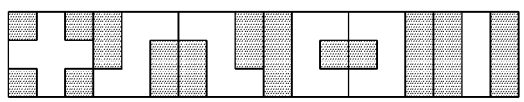
FIG. 14B illustrates a feature point pattern of a second projector.
Figure 14C:
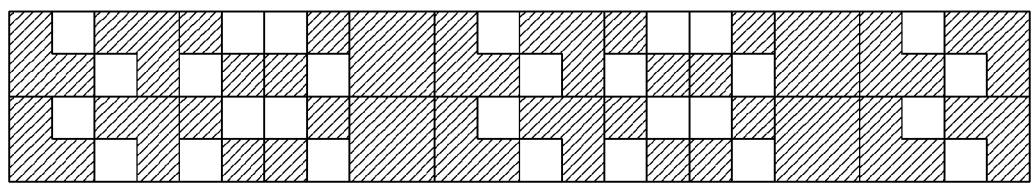
FIG. 14C illustrates a pattern fragment of the first projector.
Figure 14D:
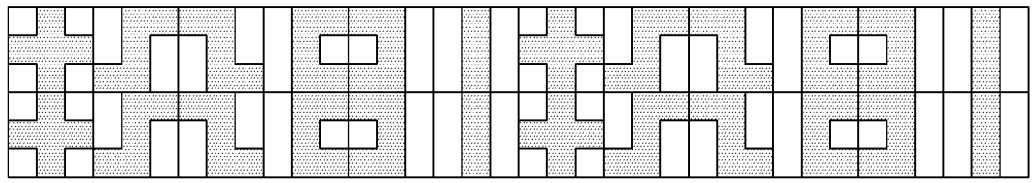
FIG. 14D illustrates a pattern fragment of the second projector.
Figure 14E:
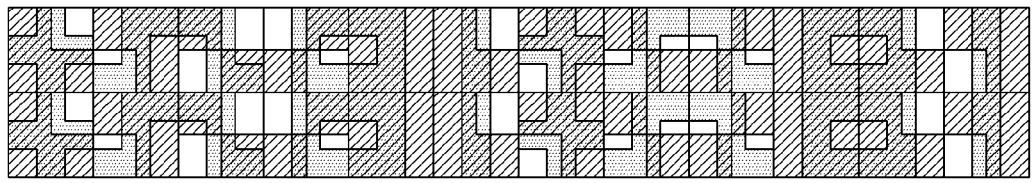
FIG. 14E illustrates a pattern of the pattern fragment of the first projector and the pattern fragment of the second projector in combination.

FIG. 14A illustrates a (period-5) feature point pattern of the first projector, FIG. 14B illustrates a (period-6) feature point pattern of the second projector, FIG. 14C illustrates a fragment pattern type of the first projector, FIG. 14D illustrates a fragment pattern type of the second projector, and FIG. 14E illustrates a (period-30) pattern obtained by combining the fragment pattern type of the first projector with the fragment pattern type of the second projector. The combined pattern is an overlap between the fragment pattern type of the first projector and the fragment pattern type of the second projector.

Figure 15:
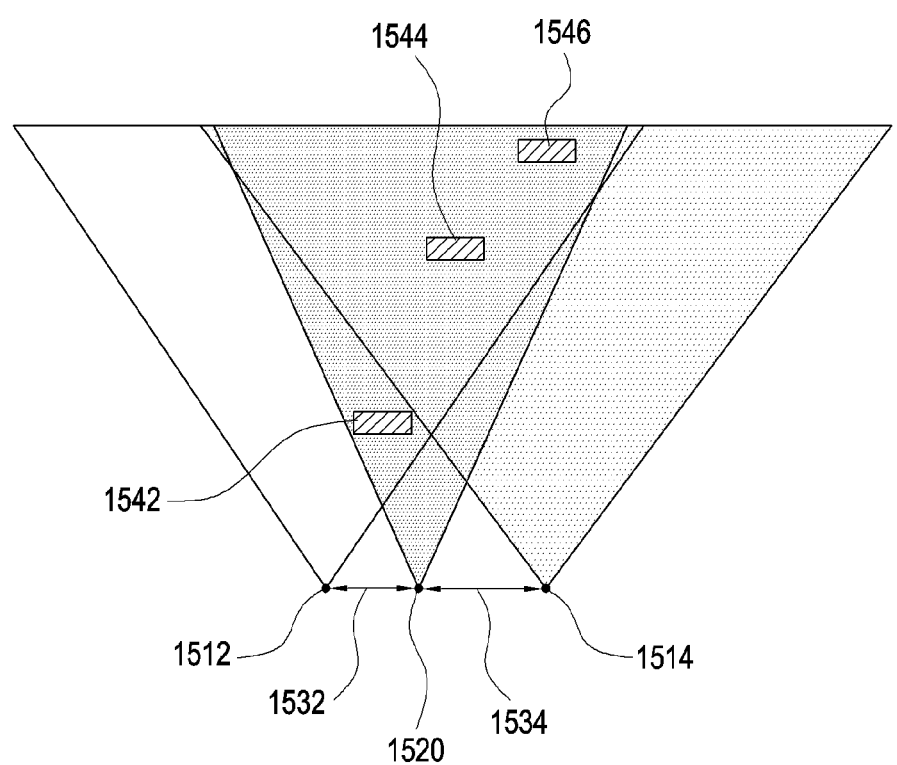
FIG. 15 is a diagram illustrating a method of recognizing a wide range of depths based on different base-lines.

FIG. 15 is an exemplary diagram illustrating a method of recognizing a wide range of depths based on different base-lines.

Referring to FIG. 15, a first projector 1512 is located to the left of a camera 1520, and a second projector 1514 is located to the right of the camera 1520. The distance between the camera 1520 and the first projector 1512 is a first base-line 1532, and the distance between the camera 1520 and the second projector 1514 is a second base-line 1534. The first base-line 1532 and the second base-line 1534 may be in a straight line. Referring to FIG. 12, there are various examples in which the first base-line 1532 and the second base-line 1534 are in a straight line. When the first base-line 1532 and the second base-line 1534 are in a straight line, a depth may be measured by a relatively simple equation. However, the first base-line 1532 and the second base-line 1534 may not be in a straight line. The arrangement of the first base-line 1532 and the second base-line 1534 may be adjusted to measure the depth of an object more accurately. That is, even though the first base-line 1532 and the second base-line 1534 are not in a straight line, the depth may be measured appropriately.

Light emitted from the first projector 1512 and the second projector 1514 is reflected from objects 1542, 1544, and 1546 located in projection directions. The first projector 1512 and the second projector 1514 are at different positions, and thus their projection ranges are different.

The projection range of each projector may be divided into a near-field zone, a middle-field zone, and a far-field zone. These terms are introduced for convenience of description, not limited to specific values. The distance between a projector and an object may vary according to the purpose of the projector. Herein, the distance between the projector and the object may be a perpendicular distance from a base-line, not a straight distance.

The first object 1542 is included in both the near-field zone of the first projector 1512 and the second projector 1514 and the blind zone of the second projector 1514. Therefore, the depth of the first object 1542 may be measured only with the first projector 1512.

The second object 1544 is located in the middle-field zone of the first projector 1512 and the second projector 1514. The second object 1544 may be triangulated by using a feature point of the first projector 1512 and a feature point of the second projector 1514.

The third object 1546 is located in the far-field zone of the first projector 1512 and the second projector 1514. An object included in the far-field zone is highly likely to be shielded by another object. For example, when light from the first projector 1512 is shielded by the first object 1542, the 3D position of the third object 1546 obtained by the first projector 1512 may be inaccurate. On the other hand, regarding light from the second projector 1514, when there is no other object shielding the third object 1546, the 3D position of the third object 1546 obtained by the second projector 1514 may be more accurate. Herein, the depth of the third object 1546 may be measured by obtaining the 3D position of the third object 1546 with the second projector 1514. However, when the third object is partially shielded, points of the first projector 1512 may be used in classification of feature points.

Figure 16:
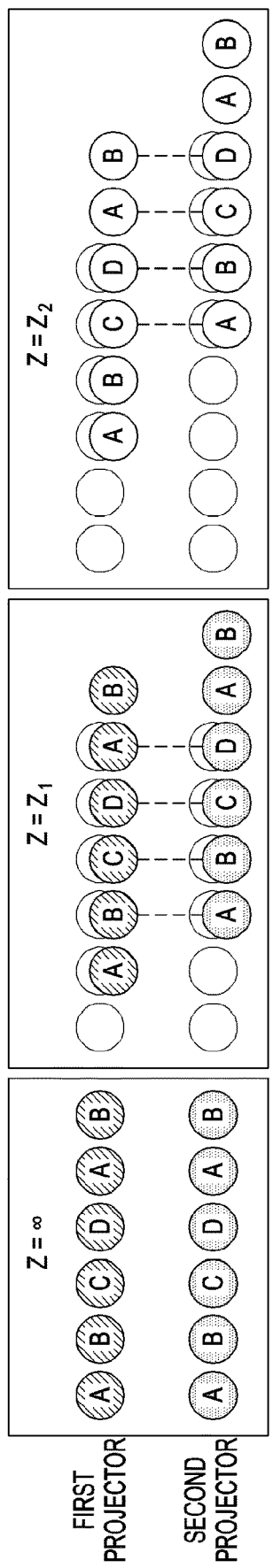
FIG. 16 is a diagram illustrating shift of feature points according to the depth of a scene, when projectors have different base-line lengths in the depth measurement method according to the present disclosure.

FIG. 16 is an exemplary diagram illustrating shift of feature points according to the depth of a scene, when the projectors have different base-line lengths in the depth measurement method according to the present disclosure.

When the projectors have different base-line distance values, feature points are shifted at different speeds according to the depth of a scene fragment.

The disparity of a feature point is inversely proportional to the depth of a scene fragment. The disparity of a feature point and the depth of a scene are placed in a relationship given by the following equation.

$$d = \frac{bf}{z} \quad \text{[Equation 3]}$$

In [Equation 3], d is a disparity value.

b is a base-line length (the distance between the camera and the projector).

f is the focal distance of the camera.

z is the depth of the scene.

The above equation may be derived from [Equation 1].

That is, as the depth of the scene fragment is larger, the disparity is smaller, and as the depth of the scene fragment is smaller, the disparity is larger. The degree to which the feature point is shifted from a reference point is the disparity. Even though the same pattern is used, feature point combinations may be increased. When the depth of the scene is too large (the distance from the camera to the object is infinite, that is, $z=\infty$), the disparity values of the projectors is 0. Therefore, feature points at the same positions may be detected despite use of the same pattern in the projectors.

In FIG. 16, it is assumed that $z_1 > z_2$. When the depth of the scene is $z_1$ (e.g., $z_1 = 2m$), a disparity difference occurs between the projectors. Likewise, when the depth of the scene is $z_2$ (e.g., $z_{2=1}$ m), a disparity difference also occurs between the projectors. However, since $z_1 > z_2$, a disparity d is larger when $z=z_2$ than when $z=z_1$ according to Equation 3. Further, when a base-line $b_2$ of the second projector is longer than a base-line $b_1$ of the first projector, the disparity of the second projector is greater than that of the first projector.

That is, since a disparity difference occurs according to the lengths of the base-lines and the depth of the scene, the patterns of feature point combinations may increase even between projectors using the same pattern.

For each point in a captured frame with increased patterns, unique combinations of feature points may be generated by combining a plurality of patterns, due to different depth values of the scene. The depth value of the scene may be restored by capturing a combination of the patterns.

Figure 17:
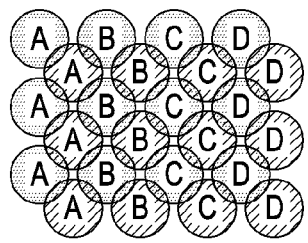
FIG. 17 is a diagram illustrating 3D points formed by the first and second projectors.

FIG. 17 illustrates 3D points formed by the first and second projectors.

Because feature points extracted from the projectors are separated and localized, the feature points may be used for unprojection. 3D points may be obtained by unprojecting the feature points. Due to the disparities of the projectors, the number of 3D points is doubled.

Figure 18:
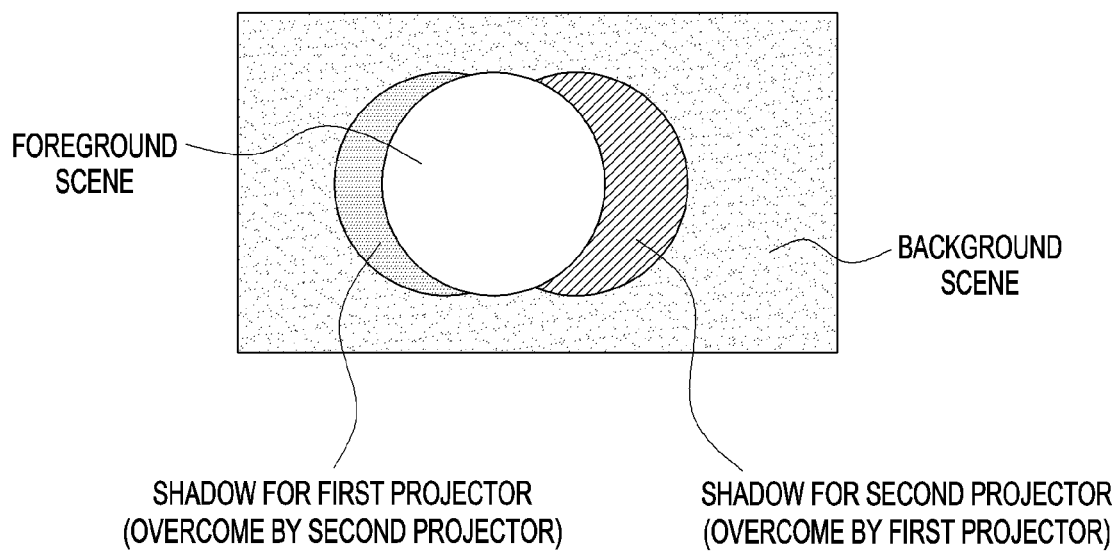
FIG. 18 is an exemplary diagram illustrating reduction of a shadowing effect according to the arrangement of projectors.

FIG. 18 is an exemplary diagram illustrating reduction of a shadowing effect according to the arrangement of the projectors.

Figure 19:
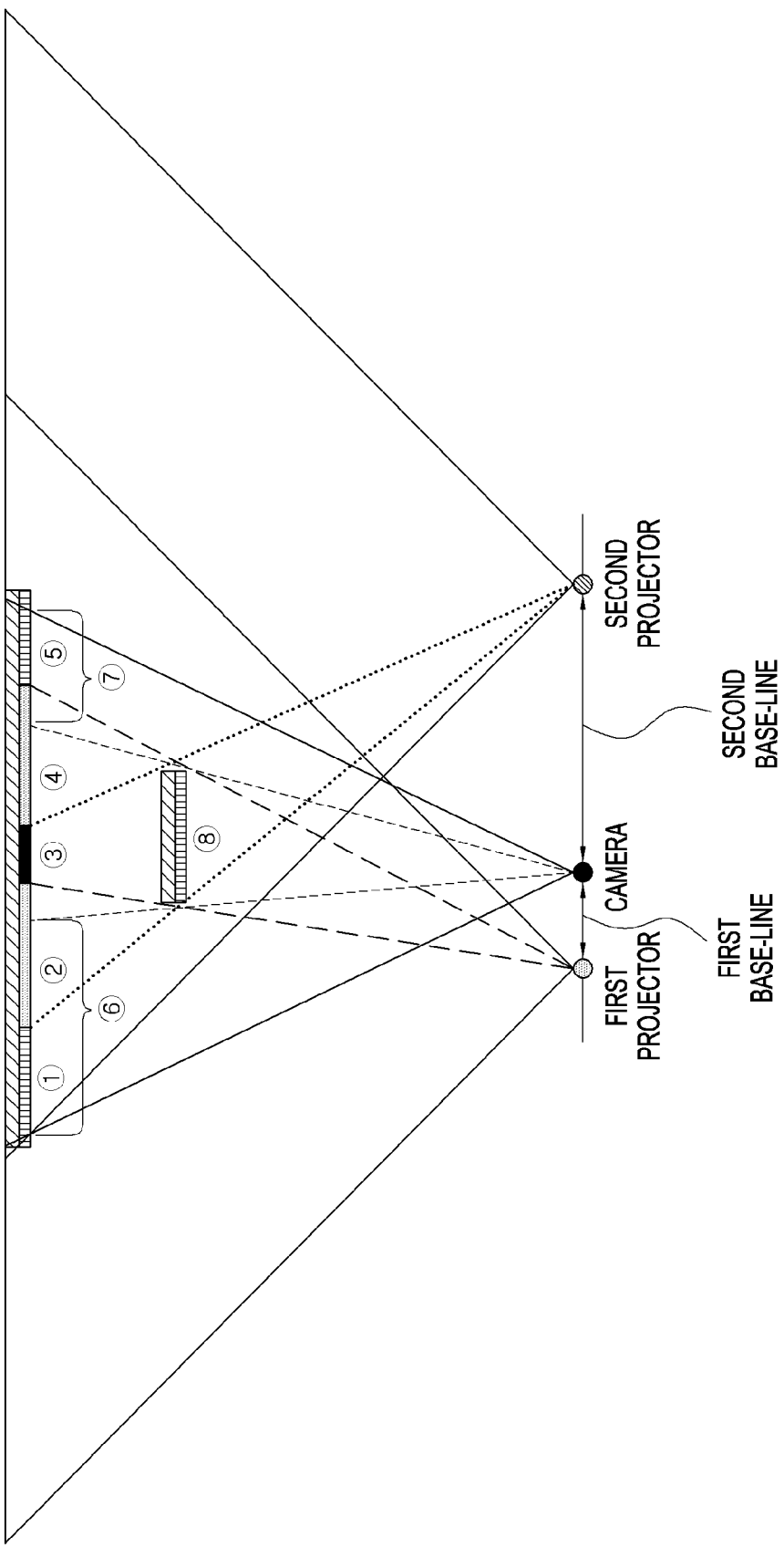
FIG. 19 is an exemplary diagram illustrating reduction of a shadowing effect according to the arrangement of projectors.

FIG. 19 is an exemplary diagram illustrating reduction of a shadowing effect according to the arrangement of the projectors.

Referring to FIG. 18, when the projectors are located opposite to each other with respect to the camera, the shadowing effect may be reduced. The shadowing effect means that light from one projector is shielded by a foreground object (near object), making it impossible to measure the depth of a background object (far object).

Referring to FIG. 18, a foreground object (⑧ in FIG. 19) and a background screen (①, ②, ③, ④, and ⑤ in FIG. 19) are illustrated. The shadow zone (③ and ④ in FIG. 19) of the foreground object is formed on the background screen by the first projector, and the shadow zone (② and ③ in FIG. 19) of the foreground object is formed on the background screen by the second projector. A shadow zone refers to an area in which light emitted from a projector is blocked by a foreground object and thus does not reach a background screen.

A background object existing in the first shadow zone (③ and ④ in FIG. 19) formed because light emitted from the first projector does not reach the background screen may not be measured by the first projector. Further, a background object existing in the second shadow zone (② and ③ in FIG. 19) formed because light emitted from the second projector does not reach the background screen may not be measured by the second projector. However, since the background object existing in the first shadow zone (③ and ④ in FIG. 19) may reflect the light emitted from the second projector, the first shadow zone may be measured fully or partially by the second projector. The second shadow zone may also be measured fully or partially by the first projector. That is, the use of the plurality of projectors may lead to reduction of the shadowing effect.

Referring to FIG. 18, the shadowing effect caused by a foreground object may be reduced according to the arrangement of the first projector and the second projector.

Referring to FIG. 19, since a first area ① may reflect light from both of the first and second projectors, it may be referred to as a full projection background area. A fifth area ⑤ may also be referred to as a full projection background area.

Because light from the second projector is blocked by the foreground object in a second area ②, depth measurement is impossible in the second area ②. However, since light from the first projector is not blocked by the foreground object, depth measurement is possible by the light of the first projector. Because light from the second projector is blocked by the foreground object in a fourth area ④, depth measurement with the light of the first projector is impossible in the fourth area ④. However, since the light from the second projector is not blocked by the foreground object, the depth measurement is possible with the light of the second projector.

In the third area ③, light from the first and second projectors is blocked by the foreground object ⑧, which makes depth measurement impossible.

Referring to FIG. 19, depth measurement is not possible for the whole second area ② and the whole fourth area ④. That is, a depth may be measured only for a part of the second area ② and a part of the fourth area ④. Considering the position of the camera, the FoV of the camera is blocked by the foreground object ⑧. A part of the second area ② included in a sixth area ⑥ corresponds to a background area in which a depth may actually be measured. Further, a part of the fourth area ④ included in a seventh area ⑦ corresponds to a background area in which a depth may actually be measured.

Compared to use of a single projector, use of two projectors may reduce the shadowing effect. The number of cameras and the number of projectors are not limited to the description of FIG. 19. A structured light depth measurement apparatus according to the present disclosure may include two or more cameras. Further, the structured light depth measurement apparatus according to the present disclosure may include three or more projectors.

The shadowing effect may be further reduced by introducing a plurality of cameras and a plurality of projectors.

Figure 20:
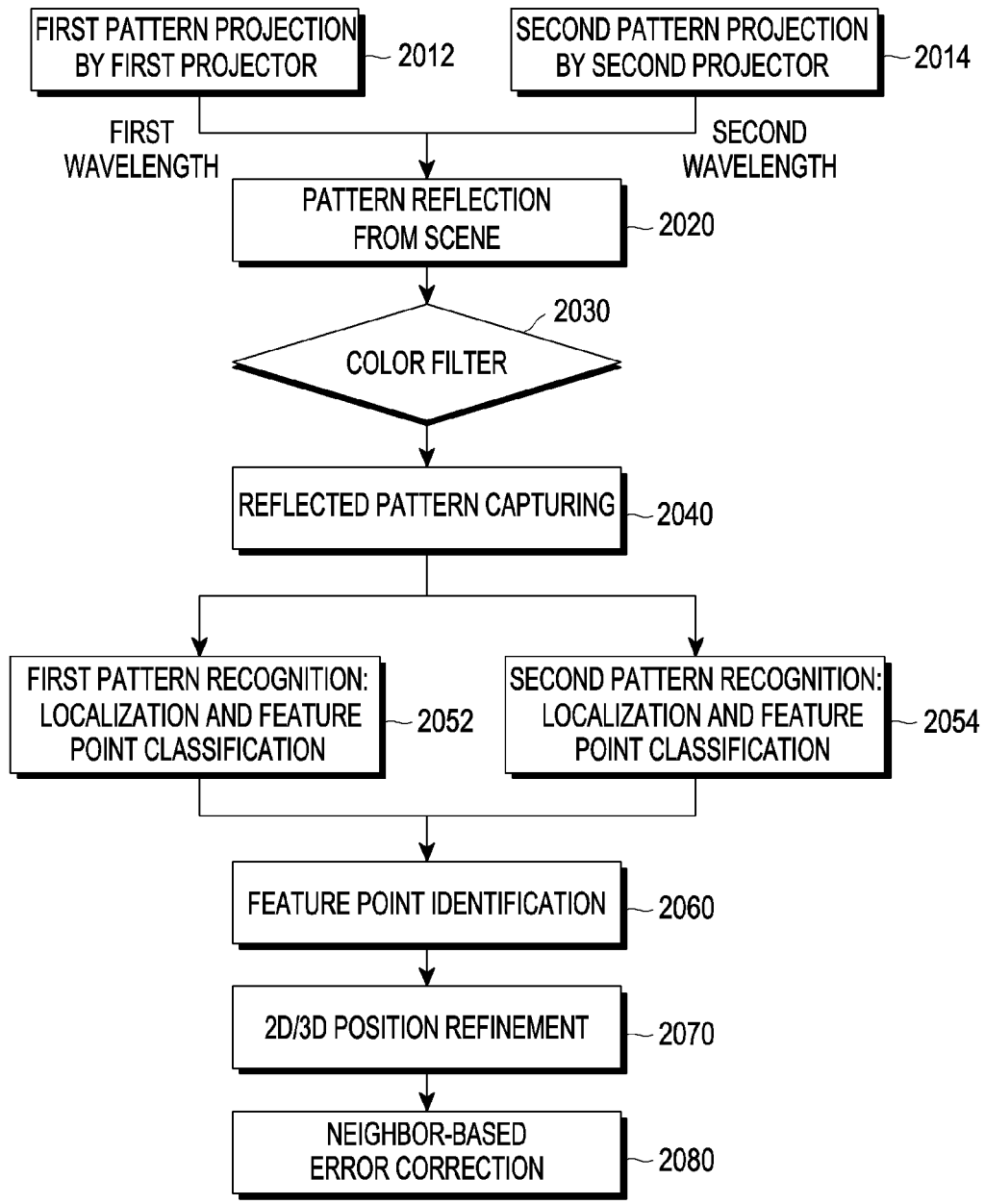
FIG. 20 is a flowchart illustrating the depth measurement method according to the present disclosure.

FIG. 20 is a flowchart illustrating a method of measuring a depth according to the present disclosure.

Light emitted from the first projector has a first pattern, and light emitted from the second projector has a second pattern.

The first and second patterns projected by the first and second projectors are reflected from scenes. The first pattern and the second pattern form one overlapped light. A wavelength of the first pattern may be different from a wavelength of the second pattern. Further, the wavelength of the first pattern and the wavelength of the second pattern may have the same frequency or similar frequencies and may be different in terms of shape, periodicity, size, and so on.

The reflected first pattern and second pattern may be separated by a color filter. When the wavelengths of the first pattern and the second pattern are different from each other, the first pattern and the second pattern may be separated according to the frequencies of the wavelengths by the color filter. The first pattern and the second pattern may be in a wavelength of the infrared region or a wavelength of the visible ray region, or may be electromagnetic waves in any other wavelength region.

The separated first pattern and second pattern are captured by the camera. The order of separating and capturing the first pattern and the second pattern may be changed. The color filter may be included in the camera, and the first pattern and the second pattern separated by the camera may be captured. For example, the color filter may have a color filter mask similar to that of FIG. 11.

The first pattern is localized, and feature points of the first pattern are classified. The classified feature points of the first pattern are referred to as first feature points, for convenience. In addition, the second pattern is localized, and feature points of the second pattern are classified. The classified feature points of the second pattern are referred to as second feature points, for convenience.

Feature points of a scene may be identified by combining the classifications of feature points of the first pattern and the second pattern or comparing the first feature points with the second feature points. Depths matching the feature points of the scene may be obtained based on the depths of the first feature points and the depths of the second feature points by comparing the first feature points with the second feature points. Further, virtual third feature points may be generated by combining information of the first feature points with information of the second feature points.

The 2D and 3D positions of objects existing in the scene may be refined by using the positions of the first feature points and the positions of the second feature points. The depths of the objects existing in the scene may be measured based on the refined 2D positions and 3D positions.

Positions and depths of neighboring feature points may be obtained based on error correction according to the refined positions and depths. Incomplete classification or inaccurate classification caused by a single pattern may be recovered based on information of the neighboring feature points.

The structured light depth camera system according to the present disclosure may include a plurality of projectors and one optical sensor (camera). The plurality of projectors may project structured light patterns in different wavelengths (colors), and the optical sensor may capture light emitted from the plurality of projectors and divide the emitted light into separate layers in a general coordinate space. The term color may be used to indicate the wavelength of a light pattern, not necessarily meaning a color in the visible light region.

In the structured light depth camera system, the patterns may be periodic and have different periodicities. A longer periodicity may be obtained by combining the patterns based on the different periodicities. Further, the patterns may be aperiodic. However, the light patterns emitted from the projectors are predetermined or even though the light patterns are randomly determined, information about the generated light patterns should be known. Unprojection may be performed based on the information about the generated light patterns.

Even though pattern fragments include non-unique pattern fragments, a combination of the pattern fragments may be sufficiently unique due to a specific mutual alignment between the non-unique pattern fragments. Whether the pattern fragments are unique may mean whether overlapped patterns are specified enough to restore the known light patterns by unprojection.

The projectors may have different base-line distances from the optical sensor. When the projectors have different base-line distances from the optical sensor, the depth measurement range of the structured light depth camera system may be widened.

The projectors may be located in different directions from the optical sensor. Since the projectors are located in different directions from the optical sensor, a shadow zone may be reduced.

Corresponding positions of the fragment patterns of the different projectors may be weight-averaged to improve localization accuracy.

The corresponding positions of the fragment patterns of different projectors may be triangulated to increase the density of a point cloud. Further, the density of the point cloud may be increased by interpolation.

The depth measurement apparatus according to the present disclosure may include a plurality of structured light projectors that emit light in different wavelengths, and an optical sensor including a color filter mask that captures the emitted light and separates the captured light into images of different patterns.

The depth measurement method proposed in FIG. 20 may be implemented in a computer system or recorded on a recording medium.

Figure 21:
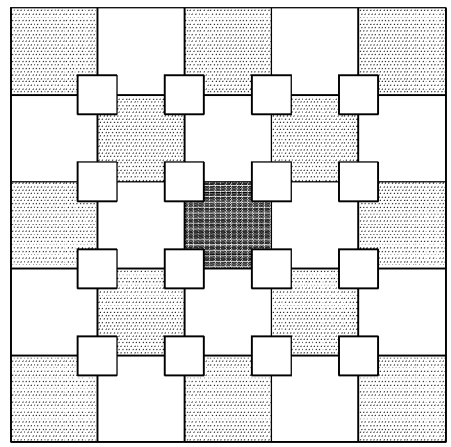
FIG. 21 is an exemplary diagram illustrating a structured light pattern and feature points according to the present disclosure.

FIG. 21 is an exemplary diagram illustrating a structured light pattern and feature points according to the present disclosure.

Referring to FIG. 21, to decode a structured light pattern, a grid such as a chessboard is used, and decoded values are stored at corners in the chessboard. The decoded values may be black and white gray values.

Referring to FIG. 21, a 4×4 combination of small squares are shown at the corners in the chessboard, and the central large square may be represented in a separate color (e.g., red, yellow, blue, or the like). The color of the central square may indicate additional characteristics. The color may be "black and white" or "black and white gray style". The 4×4 combination of small squares may be referred to as encoding markers.

Figure 22:
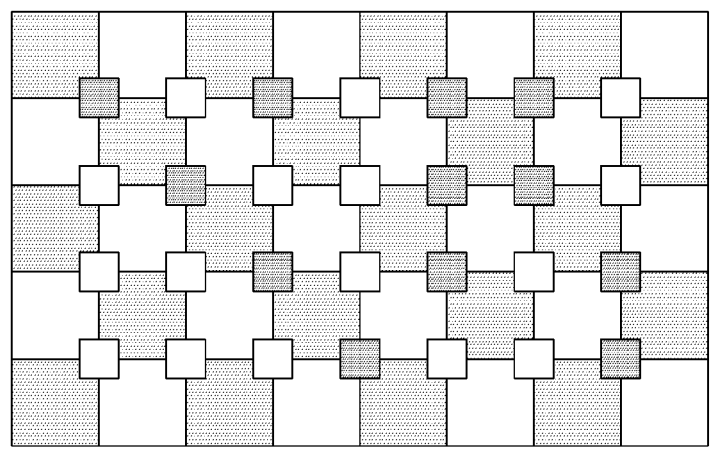
FIG. 22 is an exemplary diagram illustrating the light pattern and feature points of a projector according to the present disclosure.

FIG. 22 is an exemplary diagram illustrating a light pattern and feature points of a projector according to the present disclosure. The colors of the squares at the corners may define a decoded pattern. For example, the decoded pattern may be random, may be periodic or aperiodic, or may be generated.

Referring to FIG. 22, the light pattern and feature points may be represented in black and white. The black and white color may correspond to the intensity of the light pattern. The squares at the corners may be used as "features", but not used only as features. Further, the color of each cell in the chessboard may provide additional information about the features. For example, when the color of each cell is white or black, the diversity of the "features" is doubled. However, the method and apparatus for measuring a 3D depth according to the present disclosure are not limited by the light patterns. The method and apparatus for measuring a 3D depth according to the present disclosure may be applied to any type of structured light patterns.

Figure 23:
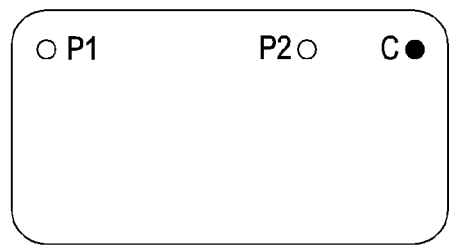
FIG. 23 is a diagram illustrating the relative positions of projectors P1 and P2 and a camera C according to the present disclosure.

FIG. 23 illustrates relative positions of the projectors P1 and P2 and the camera C in the depth measurement apparatus according to the present disclosure. The projectors and the camera may be mounted on an electronic device such as a smartphone. The projectors and the camera may be mounted according to the arrangement illustrated in FIG. 23. For more various positions of the projectors and the camera, refer to FIG. 12.

Figure 24:
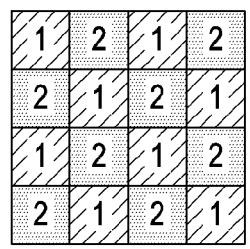
FIG. 24 is a diagram illustrating a camera color filter mask according to the present disclosure.

FIG. 24 illustrates a camera color filter mask according to the present disclosure.

The depth measurement apparatus according to the present disclosure may include a plurality of projectors. The plurality of projectors may generate light patterns using different wavelengths. Further, the plurality of projectors may project different patterns. For example, a first projector may project a first light pattern, and a second projector may project a second light pattern. The first light pattern and the second light pattern may be reflected from a scene fragment and captured by a camera. A scene refers to a point at which the first light pattern and the second light pattern are reflected by an object existing in a 3D space. The scene may be divided into fragments, measured, and processed. That is, a scene fragment may include a part of the surface of the object reflecting the light patterns. The camera may capture the reflected first light pattern and the reflected second light pattern. In this case, the reflected first light pattern and the reflected second light pattern may overlap and be incident on the camera. The first light pattern and the second light pattern may include wavelengths of different narrow bands. The overlapped first and second light patterns may be separated by passing through a color filter. Referring to FIG. 24, an exemplary color filter mask capable of separating the first light pattern from the second light pattern is shown. FIG. 24 illustrates an exemplary color filter mask. The method and apparatus for measuring a 3D depth according to the present disclosure are not limited to the color filter mask of FIG. 24, and other types of color filter masks are also available. For example, it is also possible to make the overlapped light patterns travel along two optical paths by using a spectroscope, and apply a separate color filter to each of the patterns.

Figure 25:
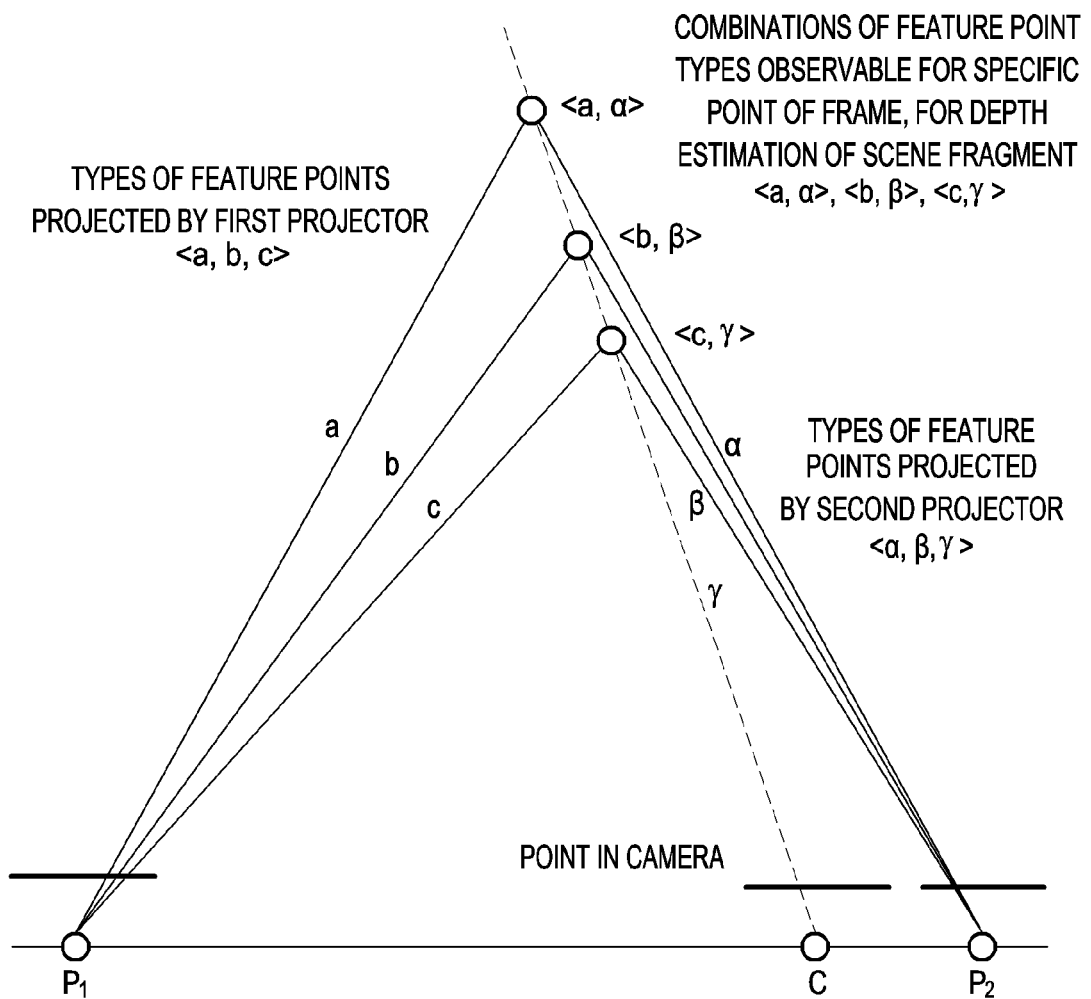
FIG. 25 is an exemplary diagram illustrating a method of measuring the depth of an object by using combinations of feature points of a plurality of projectors according to the present disclosure.

FIG. 25 is an exemplary diagram illustrating combinations of feature point types of a plurality of projectors according to the present disclosure.

The depth measurement apparatus according to the present disclosure may include a first projector P1, a second projector P2, and an optical sensor C. The first projector P1 and the second projector P2 may be infrared ray (IR) projectors. The optical sensor C may be an IR camera.

The first projector P1 may use infrared light in a wavelength of 850 nm, and the second projector P2 may use infrared light in a wavelength of 900 nm. The optical sensor may include a sensor that senses infrared light. The optical sensor may include a color filter mask (FIG. 11) such as a chessboard.

The first and second projectors P1 and P2 may be positioned opposite to each other with respect to the optical sensor C. The base-line length of the first projector P1 may be different from the base-line length of the second projector P2. For example, the base-line length of the first projector P1 may be 90 mm, and the base-line length of the second projector P2 may be 30 mm. With different base-line lengths, a wider depth measurement range may be provided. Since the first projector P1 is located opposite to the second projector P2, a full shadow zone may be reduced. The above numerical values are exemplary, not intended to limit the scope of the present disclosure.

Feature point encoding of the first projector P1 may be different from that of the second projector P2. However, the first projector P1 and the second projector P2 may emit light in similar patterns having the different feature point encodings. The pattern of the first projector P1 may be referred to as a first light pattern, and the pattern of the second projector P2 may be referred to as a second light pattern. For the depth value of each scene fragment, the different feature point encodings may generate a unique combination of feature point codes of the first light pattern and the second light pattern. An accurate depth value may be estimated from the combination of the feature point types and the corresponding positions of the feature points in the frames of the respective projectors.

Referring to FIG. 25, the types of feature points projected by the first projector P1 are <a, b, c>, and the types of feature points projected by the second projector P2 are <α, β, γ>.

The camera recognizes the combinations of the feature points of the first projector P1 and the feature points of the second projector P2. For example, the camera recognizes <a, α>, <b, β>, and <c, γ>.

When the camera C recognizes <a, α>, depth information about an object reflecting the first light pattern and the second light pattern may be obtained.

The depth measurement apparatus according to the present disclosure may be applied to various fields. For example, the depth measurement apparatus may be used in a stand-alone depth camera device for capturing 3D content for an augmented reality (AR)/virtual reality (VR) game, and a 3D printer. The depth measurement device according to the present disclosure may also be applied to a Web camera that provides a realistic avatar, a beauty motion, a depth camera of a mobile device, a depth camera for AR/VR glasses, and a depth camera for a drone or a robot (e.g., a vacuum cleaner robot). A 3D map of the surroundings may be generated and rapidly updated by using the depth measurement apparatus according to the present disclosure.

The depth measurement apparatus according to the present disclosure may be used in a depth camera for a photographic effect in combination with a depth camera for high-quality gesture recognition, a depth camera for user identification through face recognition, and an RBG camera.

According to the method and apparatus for measuring a depth according to the present disclosure, the depth range of a depth camera may be increased, the size of a feature point may be reduced, the density and number of 3D points may be increased, 3D noise of a far object may be reduced, and the shadowing effect caused by a foreground object may be reduced.

While the configuration of the present disclosure has been described above in detail with reference to the accompanying drawings, this is only an example. It is obvious to those skilled in the art that various modifications and changes can be made within the scope of the technical idea of the present disclosure. Therefore, the scope of protection of the present disclosure should not be limited to the above-described embodiments, but should be determined by the description of the appended claims.

The invention claimed is:

1. A method of measuring a three-dimensional (3D) depth by using a structured light camera including a first projector, a second projector, and an optical sensor, the method comprising:

projecting a first light pattern by the first projector;

projecting a second light pattern by the second projector;
separating a third light pattern into a filtered first pattern and a filtered second pattern by filtering the third light pattern using a color filter, the third light pattern being generated by overlap between the first light pattern and the second light pattern which have been reflected from an object;
localizing the filtered first pattern and classifying first feature points of the localized first pattern;
localizing the filtered second pattern and classifying second feature points of the localized second pattern; and
obtaining position information about the object based on the first feature points and the second feature points.

2. The method of claim 1, wherein the first projector, the second projector, and the optical sensor are located in a straight line.

3. The method of claim 1, further comprising correcting an error in the obtained position information about the object based on position information about another object neighboring to the obtained position information about the object.

4. The method of claim 1, wherein a wavelength of the first light pattern is different from a wavelength of the second light pattern.

5. The method of claim 4, wherein the color filter separates the first light pattern and the second light pattern from each other based on the wavelength of the first light pattern and the wavelength of the second light pattern.

6. The method of claim 1, wherein the first light pattern and the second light pattern have different periodicities.

7. The method of claim 1, wherein the obtaining of the position information about the object further comprises obtaining the position information about the object based on a disparity of the first light pattern and a disparity of the second light pattern.

8. The method of claim 2, wherein the optical sensor is spaced from the first projector by a first base-line distance and from the second projector by a second base-line distance, and the first base-line distance and the second base-line distance are different.

9. The method of claim 2, wherein the first projector and the second projector are located opposite to each other with respect to the optical sensor.

10. The method of claim 2, wherein the first projector, the second projector, and the optical sensor are not located in a straight line.

11. An apparatus for measuring a three-dimensional (3D) depth by using a structured light camera, the apparatus comprising:
a first projector configured to project a first light pattern;
a second projector configured to project a second light pattern;
an optical sensor configured to sense the first light pattern and the second light pattern; and
at least one processor coupled to the first projector, the second projector, and the optical sensor,
wherein the at least one processor is configured to:
separate a third light pattern into a filtered first pattern and a filtered second pattern by filtering the third light pattern using a color filter, the third light pattern being generated by overlap between the first light pattern and the second light pattern which have been reflected from an object;
localize the filtered first pattern, and classify first feature points of the localized first pattern;
localize he filtered second pattern and classify second feature points of the localized second pattern; and
obtain position information about the object based on the first feature points and the second feature points.

12. The apparatus of claim 11, wherein the first projector, the second projector, and the optical sensor are located in a straight line.

13. The apparatus of claim 11, wherein an error in the obtained position information about the object is corrected based on position information about another object neighboring to the obtained position information about the object.

14. The apparatus of claim 11, wherein a wavelength of the first light pattern is different from a wavelength of the second light pattern.

15. The apparatus of claim 14, wherein the color filter separates the first light pattern and the second light pattern from each other based on the wavelength of the first light pattern and the wavelength of the second light pattern.

16. The apparatus of claim 11, wherein the first light pattern and the second light pattern have different periodicities.

17. The apparatus of claim 11, wherein the at least one processor is configured to obtain the position information about the object based on a disparity of the first light pattern and a disparity of the second light pattern.

18. The apparatus of claim 12, wherein the optical sensor is spaced from the first projector by a first base-line distance and from the second projector by a second base-line distance, and the first base-line distance and the second base-line distance are different.

19. The apparatus of claim 12, wherein the first projector and the second projector are located opposite to each other with respect to the optical sensor.

20. The apparatus of claim 12, wherein the first projector, the second projector, and the optical sensor are not located in a straight line.

* * * * *